US011438947B2

(12) United States Patent
Kim et al.

(10) Patent No.: US 11,438,947 B2
(45) Date of Patent: Sep. 6, 2022

(54) METHOD FOR RELAYING UNSTRUCTURED TRAFFIC, AND RELAY UE

(71) Applicant: LG ELECTRONICS INC., Seoul (KR)

(72) Inventors: Laeyoung Kim, Seoul (KR); Myungjune Youn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/576,655

(22) Filed: Jan. 14, 2022

(65) Prior Publication Data

US 2022/0141898 A1    May 5, 2022

Related U.S. Application Data

(63) Continuation of application No. PCT/KR2020/010961, filed on Aug. 18, 2020.

(30) Foreign Application Priority Data

Aug. 19, 2019   (KR) .................. 10-2019-0100977
Jan. 6, 2020    (KR) .................. 10-2020-0001509

(51) Int. Cl.
*H04W 76/14*    (2018.01)
*H04W 8/00*     (2009.01)
(Continued)

(52) U.S. Cl.
CPC .......... *H04W 76/14* (2018.02); *H04W 8/005* (2013.01); *H04W 88/04* (2013.01); *H04W 92/18* (2013.01)

(58) Field of Classification Search
CPC ..... H04W 76/14; H04W 8/005; H04W 88/04; H04W 92/18
See application file for complete search history.

(56) References Cited

U.S. PATENT DOCUMENTS 11,096,086 B2 *  8/2021  Hong .................. H04W 92/18
2018/0192471 A1   7/2018  Xu et al.
(Continued)

FOREIGN PATENT DOCUMENTS

EP    3761751 A1 *  1/2021  ........... H04B 7/2606
WO    2018-067956 A1   4/2018
(Continued)

OTHER PUBLICATIONS

3GPP TS 23.287 V1.0.0, 3GPP TSGS-SA, "Architecture enhancements for 5GS to support V2X services", Rel. 16, Jun. 3, 2019. pp. 8-39 & Fig. 6.3.3.1-1.
(Continued)

*Primary Examiner* — Michael J Moore, Jr.
(74) *Attorney, Agent, or Firm* — Dentons US LLP

(57) ABSTRACT

One disclosure of the present specification provides a method for operating in relay user equipment (UE). The method may comprise the steps of: receiving a communication request message directly from a first remote UE; performing a procedure for establishing an access and mobility management function (AMF) entity and a protocol data unit (PDU) session; and storing mapping information between an identifier of a PC5 link with the first remote UE and an identifier of the PDU session on the basis of the PDU session being established for an unstructured PDU session type for unstructured traffic.

15 Claims, 25 Drawing Sheets

(51) Int. Cl.
*H04W 88/04* (2009.01)
*H04W 92/18* (2009.01)

(56) References Cited

U.S. PATENT DOCUMENTS

| | | | |
|---|---|---|---|
| 2019/0037636 A1 | 1/2019 | Kim et al. | |
| 2019/0349730 A1* | 11/2019 | Kim | H04W 4/06 |
| 2020/0077253 A1* | 3/2020 | Kim | H04W 76/30 |
| 2020/0344708 A1* | 10/2020 | Liao | H04W 8/005 |
| 2020/0389900 A1* | 12/2020 | Lee | H04W 72/0493 |
| 2022/0095260 A1* | 3/2022 | Shan | H04W 4/40 |

FOREIGN PATENT DOCUMENTS

| | | | |
|---|---|---|---|
| WO | 2018-129543 A1 | 7/2018 | |
| WO | WO-2020010088 A1 * | 1/2020 | H04W 4/70 |
| WO | WO-2020011907 A1 * | 1/2020 | H04W 40/22 |
| WO | WO-2020259811 A1 * | 12/2020 | |

OTHER PUBLICATIONS

3GPP,SA WG2 Meeting #S2-127BIS, S2-185240, "Solution of 5GC Capable UE Behind 5G-RG Connected 5GC", (2018).

3GPP TS 23.303 V12.0.0. 3rd Generation Partnership Project; Technical Specification Group Services and System Aspects; Proximity-Based Services (ProSe); Stage 2, Release 12, (2014).

3GPP TS 23.287 V1.0.0. 3rd Generation Partnership Project; Technical Specification Group Services and System Aspects; Architechture Enhancements for 5G System (5GS) To Support Vehicle-to-Everything (V2X) Services, Release 16, (2019).

* cited by examiner

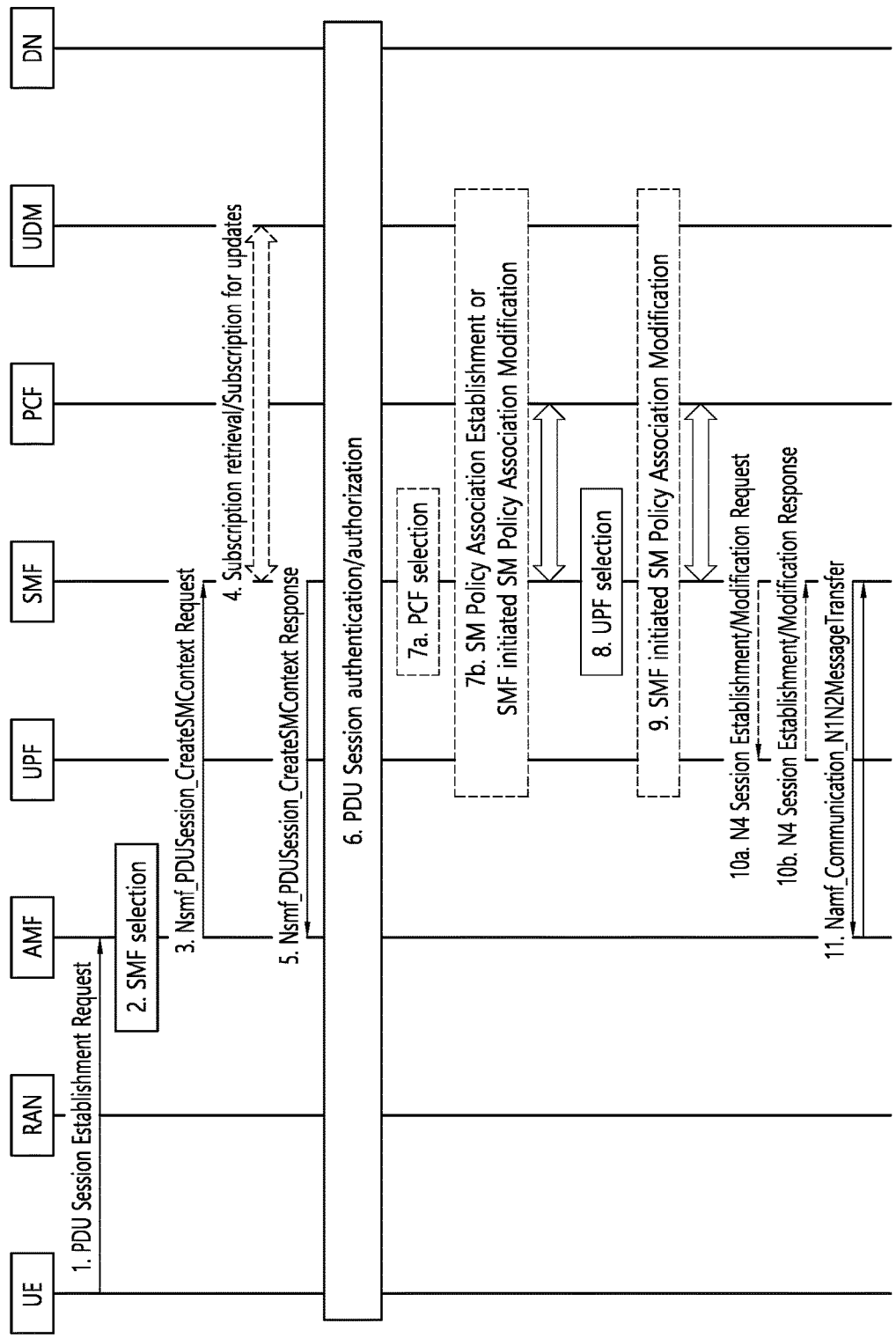

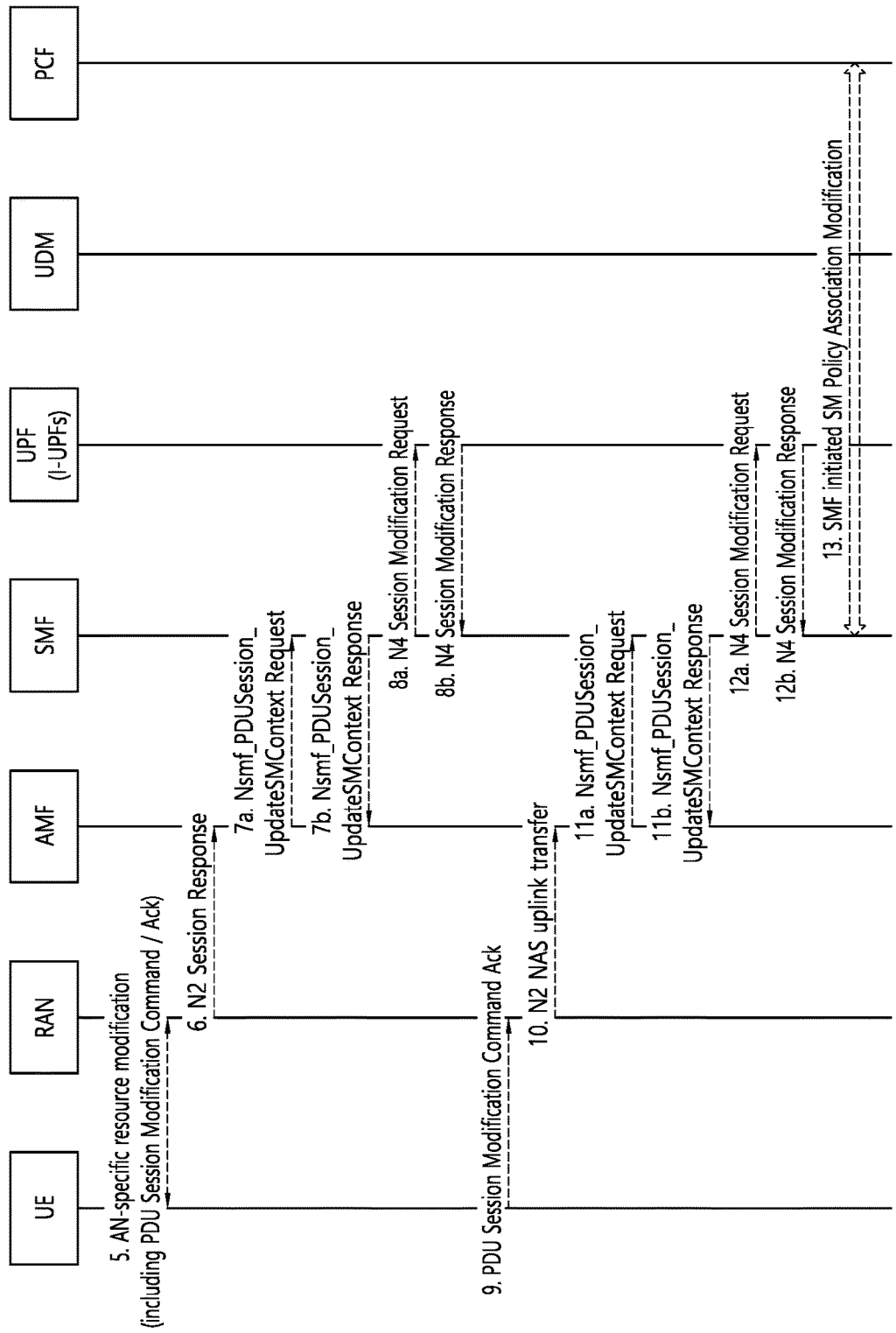

METHOD FOR RELAYING UNSTRUCTURED TRAFFIC, AND RELAY UE

CROSS-REFERENCE TO PRIOR APPLICATIONS

This application is a Continuation of International Application No. PCT/KR2020/010961 filed on Aug. 18, 2020, and published on Feb. 25, 2021 as WO 2021/034073 A1 which claims priority to Korean Patent Application Nos. 10-2019-0100977 filed on Aug. 19, 2019 and 10-2020-0001509, filed on Jan. 6, 2020, the contents of which are hereby incorporated by reference herein in their entirety.

TECHNICAL FIELD

The present specification relates to mobile communications.

BACKGROUND

With the success of Long-Term Evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The fifth-generation mobile communication supports multiples numerologies (and/or multiple Subcarrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

NR frequency band is defined as a frequency range of two types, i.e., FR1, FR2. FR1 is 410 MHz-7125 MHz, and FR2 is 24250 MHz-52600 MHz, meaning millimeter wave (mmW).

For convenience of explanation, among the frequency ranges used in the NR system, FR1 may mean "sub 6 GHz range". FR2 may mean "above 6 GHz range", and may be referred to as millimeter Wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of above 6 GHz (or, 5850, 5900, 5925 MHz, etc.). For example, a frequency band of above 6 GHz (or, 5850, 5900, 5925 MHz, etc.) included in FR1 may include an unlicensed band. The unlicensed band may be used for various purposes, e.g., for communication for a vehicle (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

The ITU suggests three usage scenarios, e.g., enhanced Mobile Broadband (eMBB), massive Machine Type Communication (mMTC), and Ultra-Reliable and Low Latency Communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1 ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 1 is a structural diagram of a next-generation mobile communication network.

The 5G Core network (5GC) may include various components, part of which are shown in FIG. 1, including an Access and mobility Management Function (AMF) 41, a Session Management Function (SMF) 42, a Policy Control Function (PCF) 43, a User Plane Function (UPF) 44, an Application Function (AF) 45, a Unified Data Management (UDM) 46 and a Non-3GPP Interworking Function (N3IWF) 49.

A UE 10 is connected to a data network via the UPF 44 through a Next Generation Radio Access Network (NG-RAN).

The UE 10 may be provided with a data service even through untrusted non-3GPP access, e.g., a Wireless Local Area Network (WLAN). In order to connect the non-3GPP access to a core network, the N3IWF 59 may be deployed.

FIG. 2 is an exemplary diagram illustrating a predicted structure of a next generation mobile communication in terms of a node.

Referring to FIG. 2, the UE is connected to a Data Network (DN) through a NG-RAN.

The Control Plane Function (CPF) node as shown may perform all or part of the Mobility Management Entity (MME) function of the fourth generation mobile communication, and all or a part of the control plane function of the Serving Gateway (S-GW) and the PDN-Gateway (P-GW) of the fourth generation mobile communication. The CPF node includes an Access and mobility Management Function (AMF) node and a Session Management Function (SMF).

The User Plane Function (UPF) node as shown is a type of a gateway over which user data is transmitted and received. The UPF node may perform all or part of the user plane functions of the S-GW and the P-GW of the fourth generation mobile communication.

The Policy Control Function (PCF) node as shown is configured to control a policy of the service provider.

The Application Function (AF) node as shown refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

In FIG. 2, a UE can simultaneously access two data networks using multiple Protocol Data Unit (PDU) sessions.

FIG. 3 is an exemplary diagram illustrating an architecture for supporting simultaneously access two data networks.

FIG. 3 illustrates an architecture that allows the UE to simultaneously access two data networks using one PDU session.

Reference points shown in FIGS. 2 and 3 are as follows.
N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.
N9 is a reference point between UPFs.
N10 is a reference point between UDM and SMF.
N11 is a reference point between AMF and SMF.
N12 is a reference point between AMF and AUSF.
N13 is a reference point between UDM and AUSF.
N14 is a reference point between AMFs.
N15 is a reference point between PCF and AMF.
N16 is a reference point between SMFs.
N22 is a reference point between AMF and NSSF.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the Open System Interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a Medium Access Control (MAC) layer, a Radio Link Control (RLC) layer, and a Packet Data Convergence Protocol (PDCP) layer.

The third layer includes Radio Resource Control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The Non-Access Stratum (NAS) layer performs functions such as connection management (session management) and mobility management.

The NAS layer is divided into a NAS entity for Mobility Management (MM) and a NAS entity for Session Management (SM).

1) NAS entity for MM provides the following functions in general.
    NAS procedures related to AMF include the following.
    Registration management and access management procedures. AMF supports the following functions.
    Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
    The NAS entity for the MM creates a NAS-MM message that derives how and where to deliver an SM signaling message through a security header representing the NAS transmission of SM signaling and additional information on a received NAS-MM.
    Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an Access Stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs Registration Management (RM) and Connection Management (CM) for 3GPP access as well as non-3GPP access.

In 5GS, PDU session types such as IPv4, IPv6, IPv4v6, Ethernet, and Unstructured are supported. The unstructured PDU session type supports transmission of non-IP traffic that does not use IP. The unstructured PDU session may be used by, e.g., an Internet of Things (IoT) terminal, a Vehicle-to-everything (V2X) terminal, or the like.

Due to an increase in user requirements for a Social Network Service (SNS), communication between UEs at a physically close distance, i.e., Device-to-Device (D2D) communication, is required. In D2D communication, the relay UE may support network connection of a remote UE.

However, the existing relay UE has a problem of providing network connectivity only using an IP-type PDU session.

SUMMARY

Accordingly, an object of the present specification is to propose a method for solving the above-described problems.

In order to solve the above-described problems, a disclosure of the present specification provides a method for operating in a relay User Equipment (UE). The method may comprise: receiving a direct communication request message from a first remote UE; performing a protocol data unit (PDU) session establishment procedure with an Access and mobility Management Function (AMF) entity; and storing mapping information between an identifier of a PC5 link with the first remote UE and an identifier of a PDU session, based on the PDU session being established for an unstructured PDU session type for an unstructured traffic.

In order to solve the above-described problems, a disclosure of the present specification provides a chipset mounted on a relay User Equipment (UE). The chipset may comprise: at least one processor; and at least one memory for storing instructions and operably electrically connectable to the at least one processor. The instructions, based on being executed by the at least one processor, may perform operations comprising: receiving a direct communication request message from a first remote UE; performing a protocol data unit (PDU) session establishment procedure with an Access and mobility Management Function (AMF) entity; and storing mapping information between an identifier of a PC5 link with the first remote UE and an identifier of a PDU session, based on the PDU session being established for an unstructured PDU session type for an unstructured traffic.

In order to solve the above-described problems, a disclosure of the present specification provides a relay User Equipment (UE). The relay UE may comprise: a transceiver; at least one processor; and at least one memory for storing instructions and operably electrically connectable to the at least one processor. The instructions, based on being executed by the at least one processor, may perform operations comprising: receiving a direct communication request message from a first remote UE; performing a protocol data unit (PDU) session establishment procedure with an Access and mobility Management Function (AMF) entity; and storing mapping information between an identifier of a PC5 link with the first remote UE and an identifier of a PDU session, based on the PDU session being established for an unstructured PDU session type for an unstructured traffic.

In order to solve the above-described problems, a disclosure of the present specification provides a non-volatile computer-readable storage medium having recorded thereon instructions. The instructions, when executed by one or more processors mounted, may cause the one or more processors to perform operation comprising: receiving a direct communication request message from a first remote UE; performing a protocol data unit (PDU) session establishment procedure with an Access and mobility Management Function (AMF) entity; and storing mapping information between an identifier of a PC5 link with the first remote UE and an identifier of a PDU session, based on the PDU session being established for an unstructured PDU session type for an unstructured traffic.

According to the disclosure of the present specification, it is possible to solve the problems of the prior art.

BRIEF DESCRIPTION OF THE DRAWINGS

FIGS. 5a and 5b are a signal flowchart illustrating an exemplary PDU session establishment procedure.

FIGS. 6a and 6b show a modification procedure for a PDU session.

DETAILED DESCRIPTION

Figure 1:
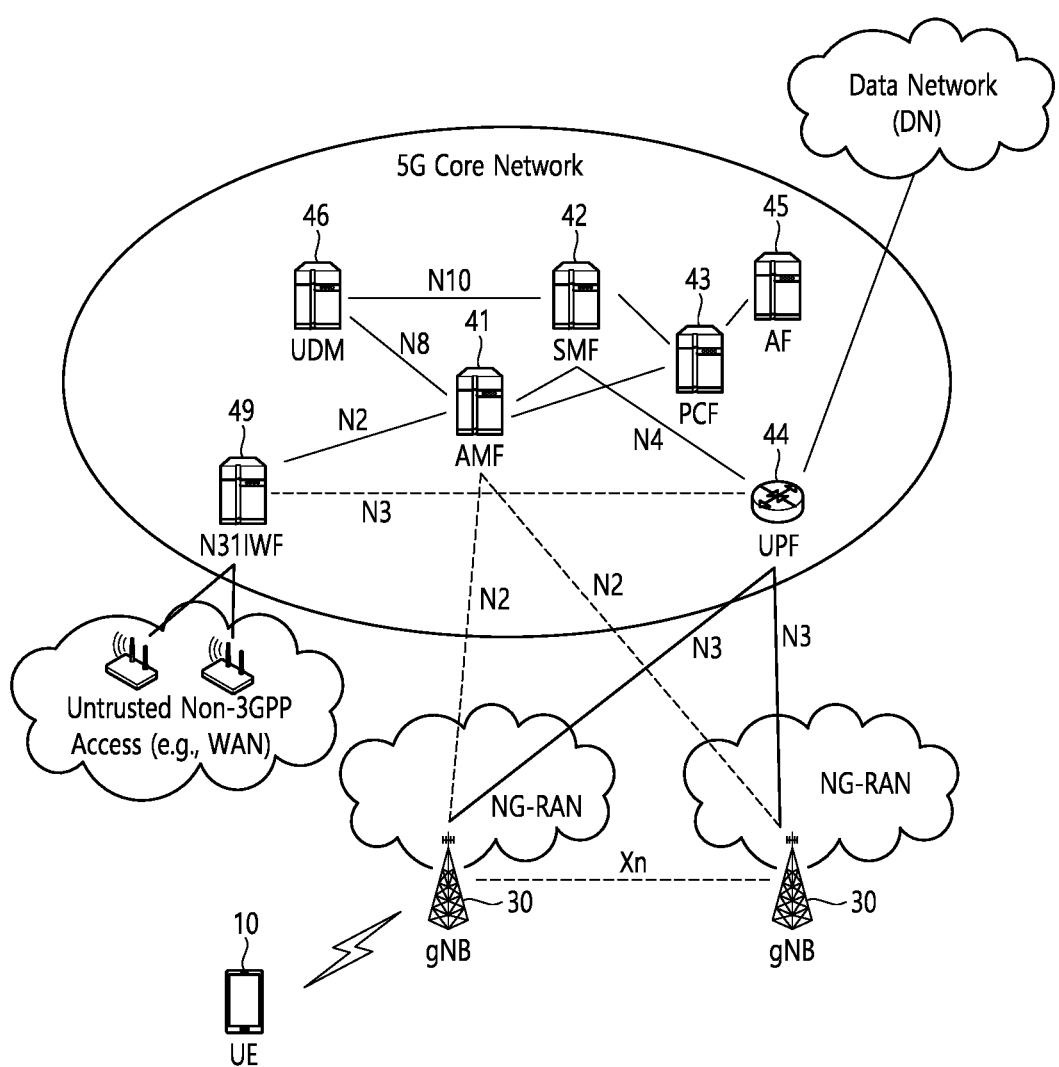
FIG. 1 is a structural diagram of a next-generation mobile communication network.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the disclosure readily understood, but not should be intended to be limiting of the disclosure. It should be understood that the disclosure may be expanded to its modifications, replacements or equivalents in addition to what is shown in the drawings.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

In the accompanying drawings, a User Equipment (UE) is illustrated by way of example, but the illustrated UE may also be referred to in terms of UE 100 (terminal), Mobile Equipment (ME), and the like. In addition, the UE may be a portable device such as a notebook computer, a mobile phone, a PDA, a smartphone, or a multimedia device or may be a non-portable device such as a PC or vehicle-mounted device.

<PDU Session Establishment Procedure>

For the PDU Session Establishment procedure, two different types of PDU Session

Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 5B:
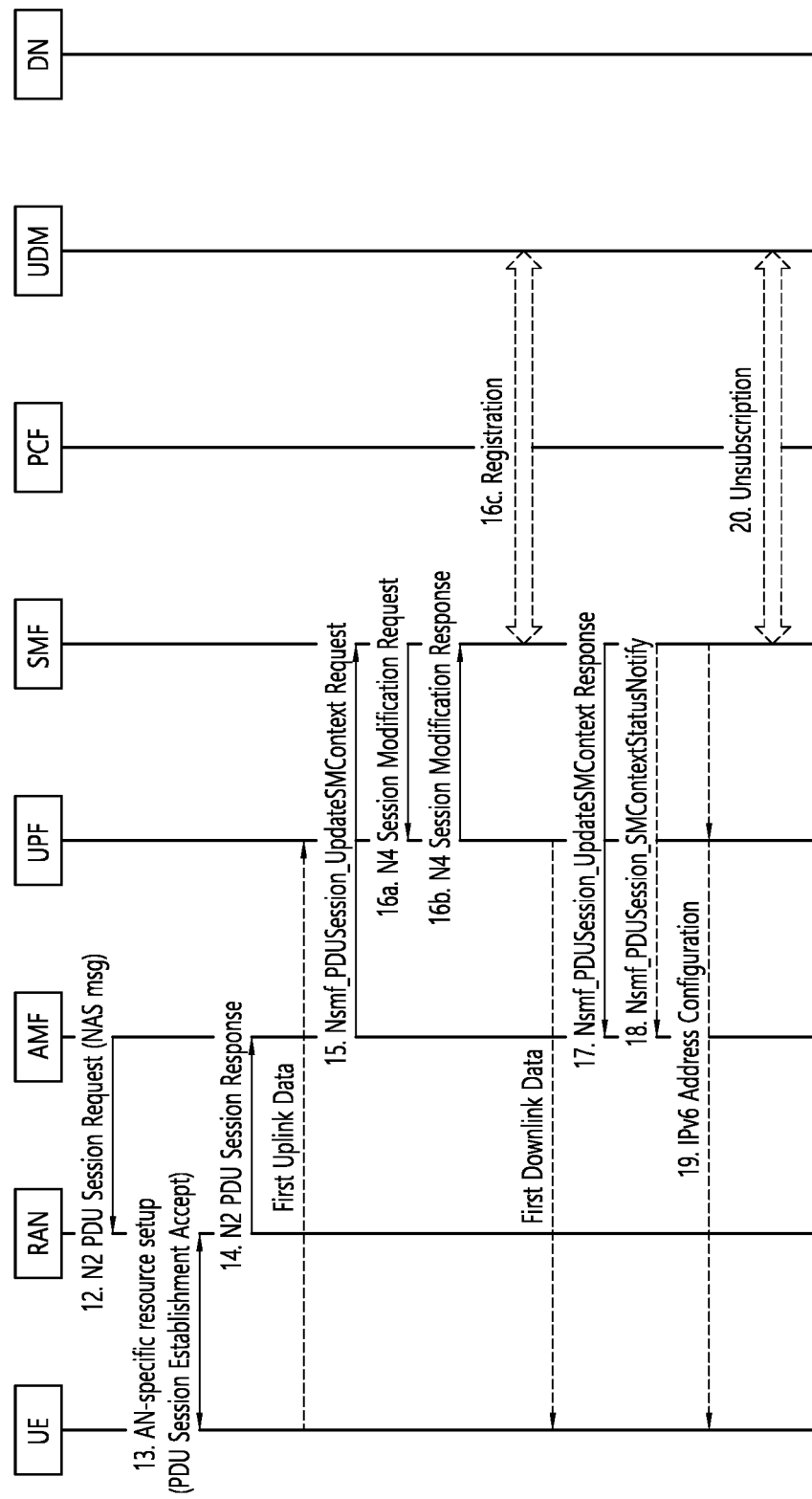

FIGS. 5*a* and 5*b* are a signal flowchart illustrating an exemplary PDU session establishment procedure.

The procedure shown in FIGS. 5*a* and 5*b* assumes that the UE has already registered on the AMF according to the registration procedure. Therefore, it is assumed that the AMF has already acquired user subscription data from UDM.

1) The UE transmits a NAS message to the AMF. The message may include Single Network Slice Selection Assistance Information (S-NSSAI), Data network Name (DNN), PDU session ID, a Request type, N1 SM information, and so on.

Specifically, the UE includes S-NSSAI from allowed NSSAI for the current access type. If information on the mapped NSSAI has been provided to the UE, the UE may provide both S-NSSAI based on the allowed NSSAI and the corresponding S-NSSAI based on the information on the mapped NSSAI. Here, the information on the mapped NSSAI is information on mapping of each S-NSSAI in the allowed NSSAI to the S-NAS SI in the NSSAI set up for Home Public Land Mobile Network (HPLMN).

More specifically, the UE may extract and store the allowed NSSAI and the information on the mapped NSSAI, included in the registration accept message received from the network (i.e., AMF) in the registration procedure. Therefore, the UE may transmit by including both S-NSSAI based on the allowed NSSAI and the corresponding S-NSSAI based on the information on the mapped NSSAI in the PDU session establishment request message.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

The AMF may select SMF.

3) The AMF may transmit Nsmf_PDUSession_CreateSMContext Request message or Nsmf_PDUSession_UpdateSMContext Request message to the selected SMF.

The Nsmf_PDUSession_CreateSMContext Request message may include SUPI, DNN, S-NSSAI(s), PDU Session ID, AMF ID, Request Type, PCF ID, Priority Access, N1 SM container, User location information, Access Type, PEI, GPSI, UE presence in LADN service area, Subscription For PDU Session Status Notification, DNN Selection Mode, and Trace Requirements. The SM container may include a PDU Session Establishment Request message.

The Nsmf_PDUSession_UpdateSMContext Request message may include SUPI, DNN, S-NSSAI(s), SM Context ID, AMF ID, Request Type, N1 SM container, User location information, Access Type, RAT type, and PEI. The N1 SM container may include a PDU Session Establishment Request message.

The AMF ID is used to identify the AMF serving the UE. The N1 SM information may include a PDU session establishment request message received from the UE.

4) The SMF transmits a Subscriber Data Request message to the UDM. The Subscriber Data Request message may include a subscriber permanent ID and DNN. The UDM may transmit a Subscription Data Response message to the SMF.

In the above-described step 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits Nsmf_PDUSession_CreateSMContext Response message or Nsmf_PDUSession_UpdateSMContext Response message to the AMF.

The Nsmf_PDUSession_CreateSMContext Response message may include Cause, SM Context ID, or N1 SM container. The N1 SM container may include a PDU Session Reject.

In step 3 above, when the SMF has received the Nsmf_PDUSession_CreateSMContext Request message and the SMF can process the PDU Session establishment request message, the SMF creates SM context and the SM context ID is delivered to the AMF.

6) Secondary authentication/authorization is optionally performed.

7a) If the dynamic PCC is used for the PDU session, the SMF selects the PCF.

7b) The SMF performs an SM policy association establishment procedure in order to establish an SM policy association with the PCF.

8) If the request type in step 3 indicates "initial request", the SMF selects the SSC mode for the PDU session. If step 5 is not performed, SMF may also select UPF. In case of the request type IPv4 or IPv6, the SMF may allocate an IP address/prefix for the PDU session.

9) The SMF provides information on the policy control request trigger condition by performing the SM policy association modification procedure.

10) If the request type indicates "initial request", the SMF may start the N4 session establishment procedure using the selected UPF, otherwise may start the N4 session modification procedure using the selected UPF.

10a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

10b) By transmitting an N4 Session Establishment/Modification response message, the UPF may respond. In case the CN tunnel information is allocated by the UPF, the CN tunnel information may be provided to the SMF.

11) The SMF transmits Namf_Communication_N1N2MessageTransfer message to the AMF. The Namf_Communication_N1N2MessageTransfer message may include PDU Session ID, N2 SM information, and N1 SM container.

The N2 SM information may include PDU Session ID, QoS Flow ID (QFI), QoS Profile(s), CN Tunnel Info, S-NSSAI from the Allowed NSSAI, Session-AMBR, PDU Session Type, User Plane Security Enforcement information, UE Integrity Protection Maximum Data Rate.

The N1 SM container may include a PDU session establishment accept message.

The PDU session establishment accept message may include an allowed QoS rule, SSC mode, S-NSSAI, and an assigned IPv4 address.

12) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

13) The RAN may perform a specific signaling exchange with a UE being related to the information received from the SMF.

The RAN also allocates RAN N3 tunnel information for the PDU session.

The RAN forwards the NAS message, which is provided in the step 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

14) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

15) The AMF may transmit Nsmf_PDUSession_UpdateSMContext Request message to the SMF. The Nsmf_P-

DUSession_UpdateSMContext Request message may include N2 SM information. Herein, the AMF may forward the N2 SM information received from the RAN to the SMF.

16a) If an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in the step 8.

16b) The UPF may transmit an N4 Session Modification Response message to the SMF.

17) The SMF transmits Nsmf_PDUSession_UpdateSMContext Response message to the AMF.

After this step, the AMF can deliver the related event to the SMF.

18) The SMF transmits Nsmf_PDUSession_SMContextStatusNotify message.

19) The SMF transmits information to the UE through the UPF. More specifically, in case of PDU Type IPv6, the SMF may generate an IPv6 Router Advertisement and may transmit the generated advertisement to the UE through the N4 and UPF.

During the procedure, if the PDU Session Establishment is not successful, the SMF notifies this to the AMF.

Figure 6A:
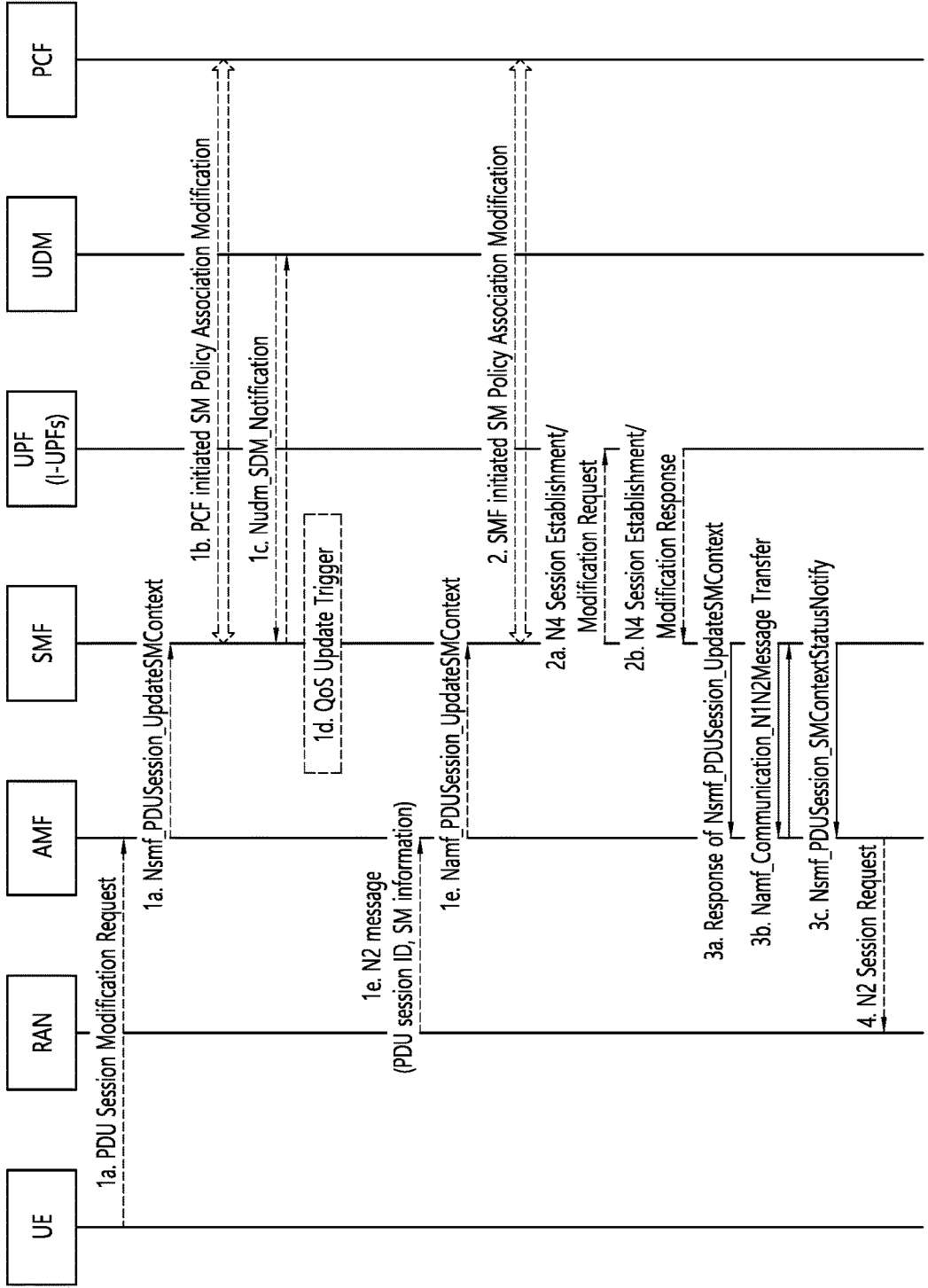

FIGS. 6a and 6b show a modification procedure for a PDU session.

The MA PDU session may be established/managed based on the PDU session modification procedure.

The PDU session modification procedure may be initiated by the UE or may be initiated by the network.

1a) When initiated by the UE, the UE may initiate a PDU session modification procedure by sending a NAS message. The NAS message may include an N1 SM container. The N1 SM container may include a PDU session modification request message, a PDU session ID, and information on the maximum data rate for integrity protection of the UE. The PDU session modification request message may include a PDU session ID, packet filters, requested QoS information, 5GSM core network capabilities, and the number of packet filters. The maximum data rate for integrity protection of the UE indicates the maximum data rate at which the UE can support UP integrity protection. The number of packet filters indicates the number of packet filters supported for QoS rules.

The NAS message is transmitted to an appropriate AMF according to the location information of the UE via the RAN. Then, the AMF transmits an Nsmf_PDUSession_UpdateSMContext message to the SMF. The message may include a Session Management (SM) context ID and an N1 SM container. The N1 SM container may include a PDU session modification request message.

1b) When initiated by the PCF among network nodes, the PCF may inform the SMF of the policy change by initiating an SM policy association modification procedure.

1c) When initiated by the UDM among the network nodes, the UDM may update the subscription data of the SMF by transmitting a Nudm_SDM_Notification message. The SMF may update the session management subscriber data and transmit an ACK message to the UDM.

1d) When initiated by SMF among network nodes, SMF may trigger QoS update.

When triggered according to 1a to 1d above, the SMF may perform a PDU session modification procedure.

1e) When initiated by an AN among network nodes, the AN may notify the SMF when an AN resource to which a QoS flow is mapped is released. The AN may transmit an N2 message to the AMF. The N2 message may include a PDU session ID and N2 SM information. The N2 SM information may include QoS Flow ID (QFI), user location information, and an indication indicating that the QoS flow is released. The AMF may transmit an Nsmf_PDUSession_UpdateSMContext message. The message may include SM context ID and N2 SM information.

2) The SMF may transmit a report on the subscription event by performing the SM policy association modification procedure. If the PDU session modification procedure is triggered by 1b or 1d, this step may be skipped. If a dynamic PCC is not deployed in the network, the SMF may apply an internal policy to decide to change the QoS profile.

Steps 3 to 7, which will be described later, may not be performed when the PDU session modification requires only the UPF operation.

3a) When initiated by the UE or AN, the SMF may respond to the AMF by sending an Nsmf_PDUSession_UpdateSMContext message. The message may include N2 SM information and an N2 SM container. The N2 SM information may include a PDU session ID, QFI, QoS profile, and session-AMBR. The N1 SM container may include a PDU session modification command. The PDU session modification command may include a PDU session ID, a QoS rule, a QuS rule operation, QoS flow level QoS parameters, and a session-AMBR.

The N2 SM information may include information to be transmitted by the AMF to the AN. The N2 SM information may include a QFI and a QoS profile to notify the AN that one or more QoS flows are added or modified. If the PDU session modification is requested by the UE for which the user plane resource is not configured, the N2 SM information to be delivered to the AN may include information on the establishment of the user plane resource.

The N1 SM container may include a PDU session modification command to be delivered by the AMF to the UE. The PDU session modification command may include QoS rules and QoS flow level QoS parameters.

3b) When initiated by the SMF, the SMF may transmit a Namf_Communication_N1N2MessageTransfer message. The message may include N2 SM information and N1 SM container. The N2 SM information may include a PDU session ID, QFI, QoS profile, and session-AMBR. The N1 SM container may include a PDU session modification command. The PDU session modification command may include a PDU session ID, a QoS rule, and a QoS flow level QoS parameters.

If the UE is in the CM-IDLE state and ATC is activated, the AMF updates and stores the UE context based on the Namf_Communication_N1N2MessageTransfer message, and then steps 3 to 7 described later may be skipped. When the UE enters the reachable state, i.e., the CM-CONNECTED state, the AMF may transmit an N1 message to synchronize the UE context with the UE.

4) The AMF may transmit an N2 PDU session request message to the AN. The N2 PDU session request message may include N2 SM information received from the SMF and a NAS message. The NAS message may include a PDU session ID and an N1 SM container. The N1 SM container may include a PDU session modification command.

5) The AN performs AN signaling exchange with the UE related to the information received from the SMF. For example, in the case of NG-RAN, in order to modify the necessary AN resources related to the PDU session, an RRC connection reconfiguration procedure may be performed with the UE.

6) The AN transmits an N2 PDU session ACK message in response to the received N2 PDU session request. The N2 PDU session ACK message may include N2 SM information and user location information. The N2 SM information may include a list of accepted/rejected QFIs, AN tunnel information, and a PDU session ID.

7) The AMF delivers the N2 SM information and user location information received from the AN to the SMF through the Nsmf_PDUSession_UpdateSMContext message. Then, the SMF delivers the Nsmf_PDUSession_UpdateSMContext message to the AMF.

8) The SMF transmits an N4 session modification request message to the UPF to update the N4 session of the UPF included in the PDU session modification.

When a new QoS flow is generated, the SMF updates the UL packet detection rule of the new QoS flow together with the UPF.

9) The UE transmits a NAS message in response to receiving the PDU session modification command. The NAS message may include a PDU session ID and an N1 SM container. The N1 SM container may include a PDU session modification command ACK.

10) The AN transmits the NAS message to the AMF.

11) The AMF may deliver the N1 SM container and user location information received from the AN to the SMF through an Nsmf_PDUSession_UpdateSMContext message. The N1 SM container may include a PDU session modification command ACK. The SMF may deliver an Nsmf_PDUSession_UpdateSMContext response message to the AMF.

12) The SMF transmits an N4 session modification request message to the UPF to update the N4 session of the UPF included in the PDU session modification. The message may include an N4 session ID.

13) When the SMF interacts with the PCF in step 1b or step 2 above, the SMF may inform the PCF whether or not the PCC decision can be performed through the SM policy association modification procedure.

The SMF may notify the requesting entity for user location information related to the change of the PDU session.

<Device to Device (D2D) Communication>

On the other hand, hereinafter, D2D communication will be described.

Figure 7:
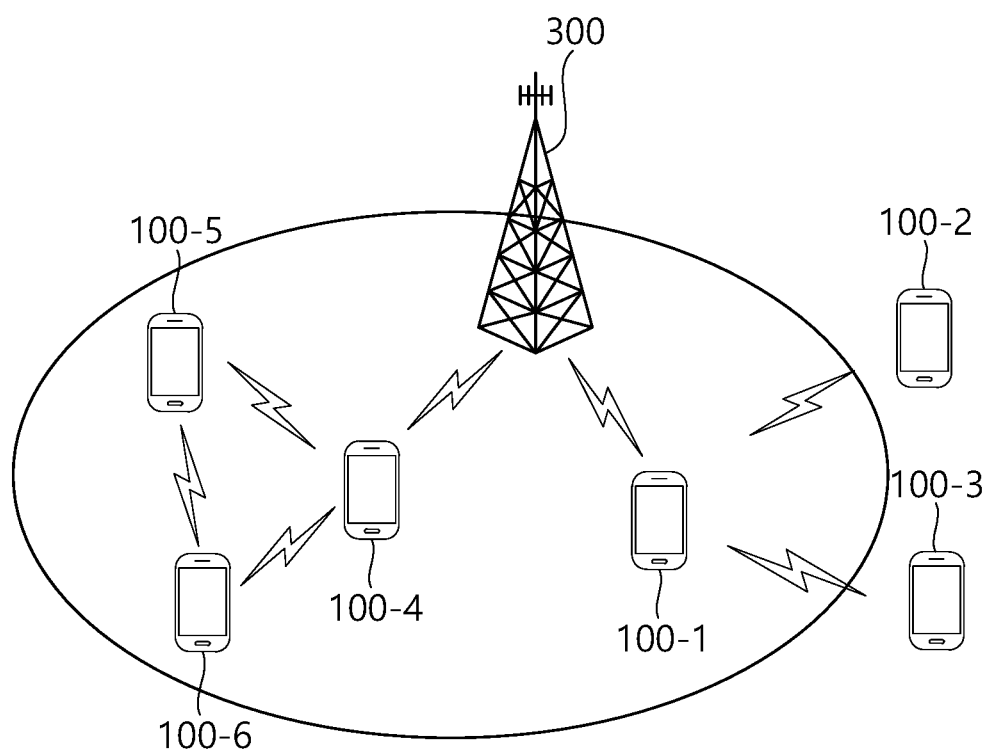
FIG. 7 shows a concept of Device to Device (D2D) communication.

FIG. 7 shows a concept of Device to Device (D2D) communication.

Due to an increase in user requirements for a Social Network Service (SNS), communication between UEs at a physically close distance, i.e., Device to Device (D2D) communication, is required. In addition, in the case of UEs used for public safety, D2D communication may be used.

In order to reflect the above requirements, as shown in FIG. 7, between UE #1 100-1, UE #2 100-2, UE #3 100-3 or between UE #4 100-4, UE #5 100-5, UE #6 100-6, a method for directly communicating without intervention of a base station (gNB) 300 is being discussed. Of course, it is possible to communicate directly between the UE #1 100-1 and the UE #4 100-4 with the help of the base station (gNB) 300. Meanwhile, UE #4 100-4 may serve as a relay for UE #5 100-5 and UE #6 100-6. Similarly, UE #1 100-1 may serve as a repeater for UE #2 100-2 and UE #3 100-3 that are far away from the cell center.

On the other hand, D2D communication is also called a Proximity Service (ProSe). In addition, a UE performing a proximity service is also referred to as a ProSe UE. A link between UEs used for the D2D communication is also called a sidelink.

The physical channels used for the sidelink include the following.

Physical Sidelink Shared Channel (PSSCH)
Physical Sidelink Control Channel (PSSCH)
Physical Sidelink Discovery Channel (PSDCH)
Physical Sidelink Broadcast Channel (PSBCH)

In addition, there are the following physical signals used in the sidelink.

Demodulation Reference signal (DMRS)
Sidelink Synchronization signal (SLSS)

The SLSS includes a Primary Sidelink Synchronization Signal (PSLSS) and a Secondary Sidelink Synchronization Signal (SSLSS).

Figure 8:
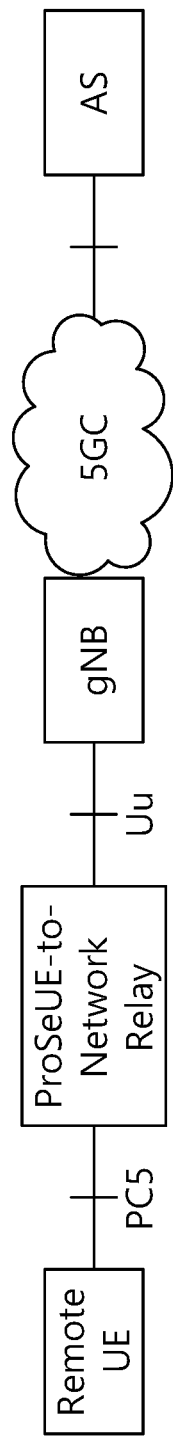
FIG. 8 shows an architecture of a UE-to-Network Relay.
Figure 9:
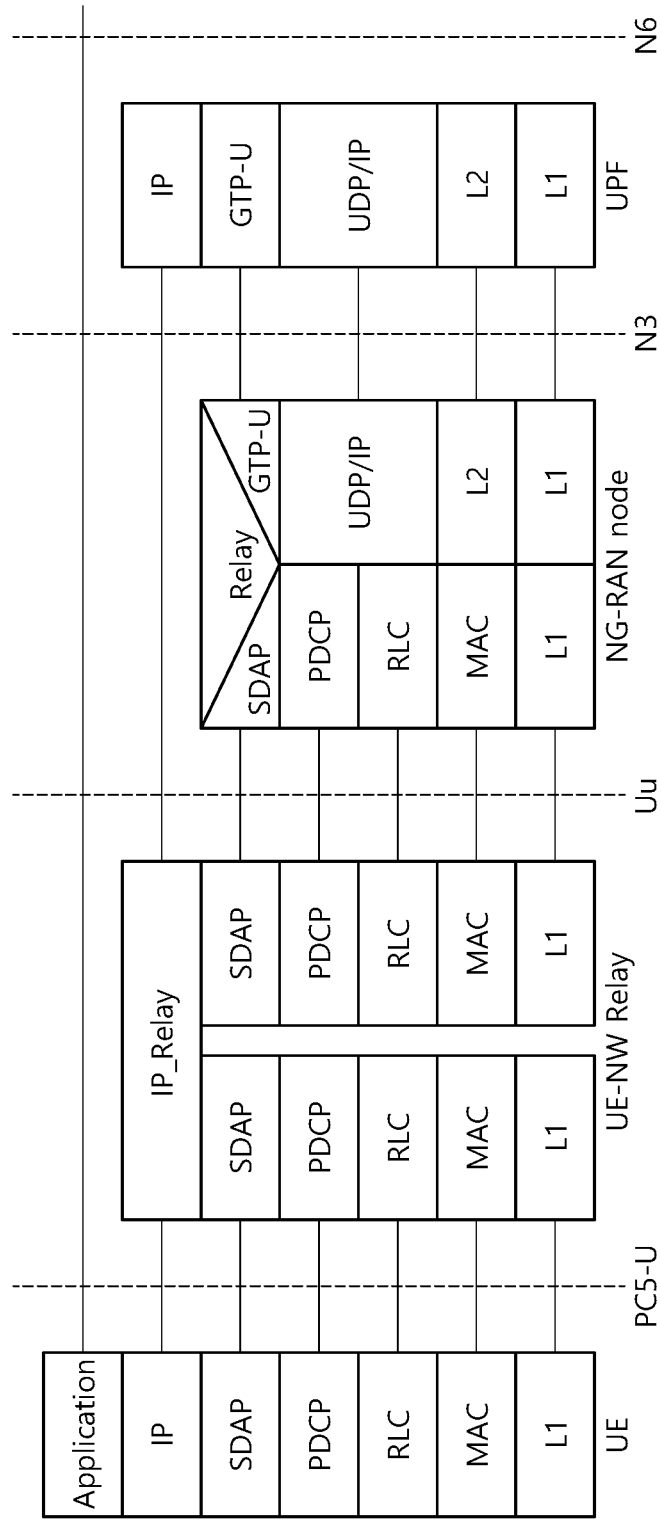
FIG. 9 shows a protocol stack for UE-to-Network Relay.

FIG. 8 shows an architecture of a UE-to-Network Relay.
FIG. 9 shows a protocol stack for UE-to-Network Relay.

Referring to FIG. 8, UE-to-Network Relay supports the network connection of the remote UE.

The PC5 link is the interface between the UE and the UE-to-Network Relay. The Uu link is the interface between the UE-to-Network Relay and the base station.

If the UE has established a PC5 link with the UE-to-Network Relay, the UE is considered a remote UE.

In this case, when the remote UE maintains both the PC5 link and the Uu link, the network core entity connected to the Uu link may not be aware of the existence of the PC5 link toward the UE-to-Network Relay.

Communication between the remote UE and the UE-to-Network Relay is performed as one-to-one direct communication.

Meanwhile, in the past, UE-to-Network Relay supported only one-hop, but recently, UE-to-Network Relay needs to be improved to support multi-hop.

<Problems to be Solved by the Disclosure of the Present Specification>

Meanwhile, in 5GS, PDU session types such as IPv4, IPv6, IPv4v6, Ethernet, and Unstructured are supported. The unstructured PDU session type supports transmission of non-IP traffic that does not use IP. The unstructured PDU session may be used by, e.g., an Internet of Things (IoT) UE, a Vehicle to Everything (V2X) UE, or the like.

However, the existing UE-to-Network Relay provides only network connectivity using an IP-type PDU session.

<Disclosure of the Present Specification>

In order to solve the above-mentioned problem, the disclosures of the present specification aim to provide methods in which a UE-to-Network Relay provides network connectivity for an unstructured PDU session.

Hereinafter, in the present specification, user equipment (UE) and a terminal are mixed and described. In addition, UE-to-Network Relay, ProSe UE-to-Network Relay, Relay, Relay UE, UE-Network Relay, 5G ProSe UE-to-Network Relay are mixed and used. In addition, the unstructured PDU session type and the non-IP PDU session type are mixed and used. In addition, unstructured traffic/packet/data, non-IP traffic/packet/data, and non-IP communication are mixed and used. In addition, an Intermediate Relay UE and an Intermediate Relay are mixed and used.

The method proposed below is applicable to various services, e.g., V2X, Public Safety, IoT, and the like.

Hereinafter, the methods presented in the present specification, i.e., a method for supporting a remote UE to transmit and receive non-IP data through a UE-to-Network Relay, consist of a combination of one or more of the following operations/configurations/steps.

I. First disclosure: A method for a remote UE to transmit and receive non-IP data through a UE-to-Network Relay: Remote UE and UE-to-Network Relay is connected in one-hop FIGS. 10a and 10b are signal flow diagrams illustrating a method according to the first disclosure.

Figure 10A:
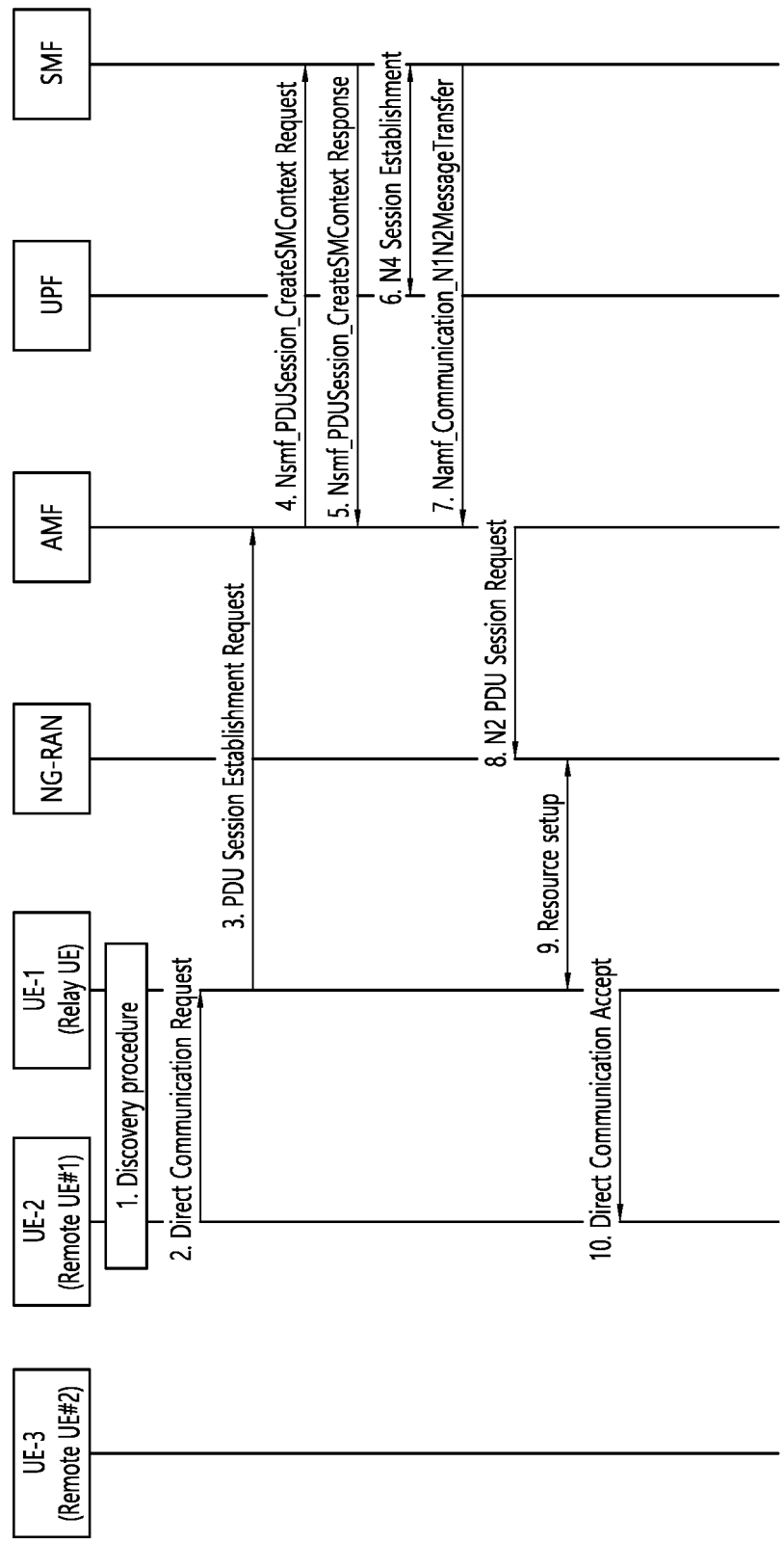
FIGS. 10a and 10b are signal flow diagrams illustrating a method according to the first disclosure.
Figure 10B:
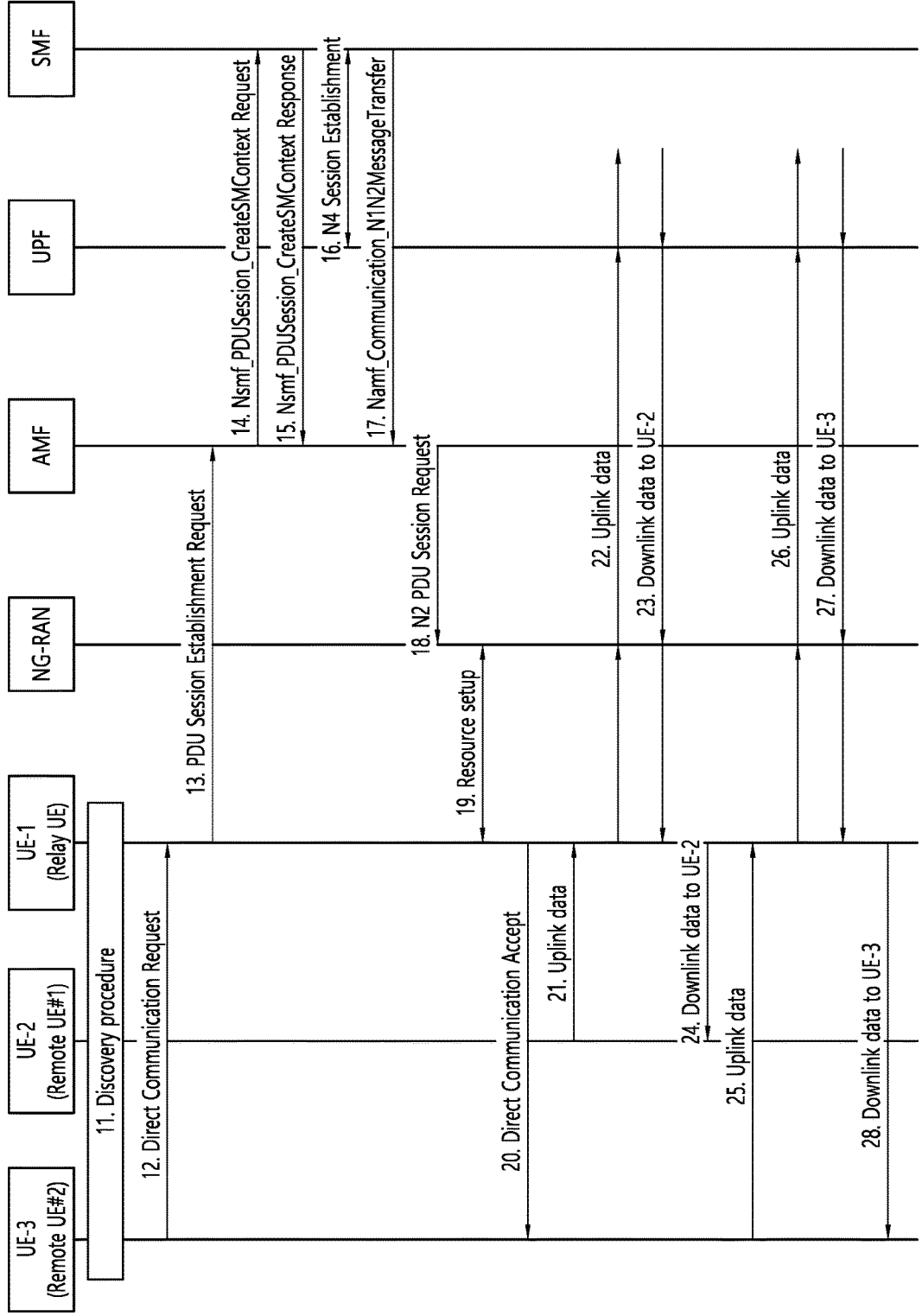

All steps shown in FIGS. 10a and 10b are not necessarily performed, and some steps may be omitted. However, for better understanding, most of the steps will be described below.

For the PDU session establishment process in FIGS. 10a and 10b, reference will be made to the contents of FIGS. 5a and 5b.

Step 1. It is assumed that the UE-1 (i.e., Relay UE) has performed registration with 5GS. Additionally, the UE-1 (i.e., Relay UE) may be in a state in which a PDU session required for itself is generated. However, this may be performed after step 1.

The UE-2 (i.e., Remote UE #1) searches for a UE-to-Network Relay to receive network connection services, and selects the UE-1 as a UE-to-Network Relay. This discovery process may be a model A discovery or a model B discovery.

For reference, the model A discovery and the model B discovery are as follows.

Model A: involves at least one UE announcing "I am here"

Model B: involves at least one UE asking "who is there" and/or "are you there"

That is, when searching for UE-to-Network Relay, in the case of model A, the relay UE announces that it can provide a relay service, and in the case of model B, the remote UE solicits whether the relay UE is nearby.

The UE-to-Network Relay may include various information related to its provision of network connection services in the message for the announcement and/or the message for responding to the solicit (these messages may be interpreted as messages indicating that relay service is available). The various information may include DNN information, slice-related information, supportable PDU session type information, information on whether network connection services can be provided in one-hop (or generalized information about how many hops it is possible to provide network connection services), etc., and various information may be implicit and included in combination.

When the UE-2 knows that the UE-1 is acting as a UE-to-Network Relay (e.g., through another method, (specifically, via a message from the application layer), or when a relay UE<→remote UE relationship is formed and a unicast link is additionally created (e.g., for another service), step 1 may be omitted.

Step 2. The UE-2 transmits a request message for setting up a unicast link to receive network connection services from the UE-1, i.e., a direct communication request message.

The direct communication request message may be a PC5-S message. Alternatively, the PC5-S message may be modified/extended for the direct communication request, and a new PC5-S message may be defined and used.

The UE-2 may include one or more of the following information in the direct communication request message.

a) Information indicating that the unicast link requested to be established is for non-IP communication The information may be "Indication whether IP communication is used." Alternatively, the information may be expressed in the form of information such as PDU Session type=Unstructured PDU session type.

b) DNN-related information

The DNN-related information may include slice-related information.

Even if the DNN-related information is not included, the UE-1 may implicitly infer it. For example, it can be inferred that the UE-1 provides network connection services only for a specific DNN, and the UE-1 notifies the Layer-2 ID mapped to the specific DNN in the discovery process of the above step 1, and accordingly, it can be inferred that the UE-2 transmits a direct communication request message using this Layer-2 ID.

c) identifier information indicating the remote UE (or Remote User ID).

The identifier information indicating the remote UE may be one or more of the following. This may be applied throughout the present specification.

c-1) Subscription Permanent Identifier (SUPI)
c-2) Subscription Concealed Identifier (SUCI)
c-3) Generic Public Subscription Identifier (GPSI)
c-4) Permanent Equipment Identifier (PEI)
c-5) MSISDN
c-6) ID usable when the UE operates as a remote UE: Let this be a remote UE-specific identifier. For this remote UE-specific identifier, a different ID may be used for each DNN, or a single ID may be used for all DNNs. In addition, the remote UE-specific identifier may include HPLMN information of the UE. A portion other than the HPLMN information may be in an encrypted form.
c-7) Application layer user ID d) Information indicating that it is intended to receive network connection services.

e) Hop related information of the remote UE, i.e., the UE-2.

The above information is information that enables the UE-to-Network Relay, i.e., the UE-1, to know how many hops it is related to the remote UE, the UE-2. For example, if the UE-2 includes 1 as the information, it can be seen that the UE-1 provides network connection services to the UE-2 by one hop.

In the present specification, a unicast link may be interpreted as a PC5 unicast link, a Layer-2 link, or a one-to-one link, and may be used interchangeably.

The direct communication request message may mean one or more PC5-S messages transmitted by the UE-2 to establish a unicast link with the UE-1 (or to complete unicast link establishment or in relation to a unicast link). When a plurality of PC5-S messages is used, the above information may be divided and included in a plurality of PC5-S messages. This may be applied throughout the present specification.

Step 3. The UE-1 determines, based on the direct communication request message received from the UE-2, to create a new PDU session for the DNN to which the UE-2 wants to be provided with network connection services. Accordingly, a PDU session establishment request message is transmitted to the network. The PDU session to be created is an unstructured type PDU session.

The PDU session establishment request message may include identifier information indicating the remote UE. This may be included in the AMF-interpretable NAS message and/or may be included in the PDU session establishment request message which is the SMF-interpretable SM NAS message.

In addition, the PDU session establishment request message may include information indicating that it is for a remote UE or information indicating that it is a relay UE operation. This may be included in the AMF-interpretable NAS message and/or may be included in the PDU session establishment request message which is the SMF-interpretable SM NAS message.

Prior to performing step 3, the UE-1 may determine (or check) whether it is possible to provide network connection services to the UE-2 and/or whether the UE-2 can receive network connection services from itself, i.e., the UE-1, together with the network or alone. Alternatively, this determination (or check) may be performed together with PDU session establishment. In the latter case, upon receiving the PDU session establishment request message, the AMF may check/authenticate process for the UE-1, which is a UE-to-Network Relay, and the UE-2, which is a remote UE, using identifier information indicating the remote UE. To this end, the AMF may need to obtain necessary subscriber information from UDM or UDR or a network function storing subscriber information of the remote UE based on the identifier information indicating the remote UE.

Step 4. The AMF transmits a PDU session establishment request message to the SMF.

That is, the PDU session establishment request message transmitted in the above step 3 by the UE-1 is transferred to the SMF through the AMF and processed. Accordingly, the PDU session establishment procedure may be interpreted to be actually performed with the AMF and SMF, and this is applied throughout the present specification.

When the SMF checks whether the UE-1 can provide network connection services to the UE-2 and/or whether the UE-2 can receive network connection services from the UE-1, the SMF may check/authenticate process for the UE-1, which is a UE-to-Network Relay, and the UE-2, which is a remote UE, using identifier information indicating the remote UE. To this end, the SMF may need to obtain necessary subscriber information from UDM or UDR or a network function storing subscriber information of the remote UE based on the identifier information indicating the remote UE.

The SMF may transmit remote UE-related information to a Policy Control Function (PCF).

Also, the PCF may perform the check/authentication.

The SMF may perform an operation that allows the relay UE to create multiple PDU sessions for the same DNN+S-NSSAI based on at least one of identifier information indicating the remote UE, information indicating that it is for the remote UE, and information indicating that it is a relay UE operation.

Step 5. The SMF sends a response message to the AMF.

Step 6. The SMF performs N4 session establishment process with the UPF. In addition, the SMF may transmit remote UE-related information to the UPF.

Step 7. The SMF sends a Namf_Communication_N1N2MessageTransfer message to the AMF. The message may include a PDU session establishment accept message to be transmitted to the UE-1 and N2 SM information to be transmitted to the NG-RAN.

Step 8. The AMF sends an N2 PDU session request message to the NG-RAN. This message includes the N2 SM information received from the SMF and a PDU session establishment accept message to be transmitted to the UE.

Step 9. The NG-RAN delivers a PDU session establishment accept message to the UE-1. In addition, the NG-RAN configures necessary radio resources in relation to the created PDU session. For this, an RRC connection reconfiguration message may be used.

Step 10. The UE-1 sends to the UE-2 a response to the unicast link setup requested in the above step 2, i.e., a direct communication accept message. This message may include information indicating that a PDU session has been create d. In addition, this message may include hop-related information of the remote UE.

Immediately after the above step 2, the UE-1 may once transmit to the UE-2 a response stating that the unicast link setup request has been successfully received, and then, when a PDU session is created, the UE-1 may transmit a direct communication accept message to the UE-2.

Alternatively, the UE-1 may transmit a direct communication accept message to the UE-2 immediately after the above step 2. Thereafter, in step 10, a message indicating that the PDU session has been created may be transmitted.

Alternatively, the UE-1 may transmit a direct communication accept message to the UE-2 immediately after the above step 2. Then, even if the UE-2 has sent uplink data, but the UE-1 has not yet create a PDU session for the UE-2, the data may be stored and transmitted after the PDU session is created.

The UE-1 (i.e., Relay UE) stores the context as it creates a PDU session for the UE-2 (i.e., remote UE). The UE-1 (i.e., relay UE) needs to store information about which PDU session is mapped to which unicast link in particular. Accordingly, the context includes one or more of the following information.

a) PDU session ID:

This is generated by the UE-1 to request PDU session establishment, and follows the prior art.

b) Unicast link identifier information:

This is information to identify the created unicast link. That is, it may be a PC5 link identifier, or it may be a newly defined ID for the disclosure of the present specification.

c) Identifier information indicating the remote UE d) Its own Layer-2 ID:

This is the ID of Layer-2 of the UE-1 used for the created unicast link.

e) Layer-2 ID of unicast link partner/peer UE:

This is the ID of Layer-2 of the UE-2 used for the created unicast link. This may be obtained in the discovery process of the above step 1, or may be obtained from the Layer-2 ID used by the UE-2 to transmit the direct communication request message in the above step 2.

f) Information indicating that it is a unicast link for non-IP based communication g) Set of PC5 QoS Flow Identifiers (PFIs). Each PFI is associated with a QoS parameter (i.e., PC5 5QI (PQI)).

In the case of an unstructured PDU session, as only one QoS flow is supported, it may be information about one PC5 QoS flow.

h) PC5 QoS flow ID of unicast link mapped to QoS flow ID of the PDU session i) DNN information (this may include slice-related information)

j) In addition to the above information, necessary information related to the unicast link k) information related to hops with the remote UE.

This is information on how many hops away the remote UE is. In the example shown in FIG. 10, the hop is 1.

It can be understood that the UE-1 stores all necessary information related to the unicast link created with the UE-2. In particular, since the created unicast link is for providing network connection services for other UEs, it can be understood that information about a related PDU session (the information a) above) should be stored together.

It can be understood that the UE-2 also stores all necessary information related to the unicast link created with the UE-1. This may be information except for the information a) in the information stored by the UE-1. In the case of "e)

Layer-2 ID of unicast link partner/peer UE" among the above information, it may be obtained in the discovery process of the above step 1, or may be obtained from the Layer-2 ID used by the UE-1 to transmit the direct communication accept message in step 10.

In relation to the unicast link, when specific information is updated in the context stored by the UE (e.g., the UE-1 that is a relay UE), it is updated and stored. For example, when the Layer-2 ID (Layer-2 ID of the UE-1, Layer-2 ID of the UE-2) is updated, the UE (e.g., the UE-1 that is a relay UE) updates and stores it.

Step 11. The UE-3 (i.e., Remote UE #2) searches for a UE-to-Network Relay to receive network connection services, and selects the UE-1 as a UE-to-Network Relay.

For detailed operation, refer to the above step 1.

Step 12. The UE-3 transmits a request message for setting up a unicast link to receive network connection services from the UE-1, i.e., a direct communication request message.

For detailed operation, refer to the above step 2.

Step 13. The UE-1 creates, based on the direct communication request message received from the UE-3, a PDU session for the DNN to which the UE-3 wants to be provided with network connection services. Accordingly, a PDU session establishment request message is transmitted to the network.

For detailed operation, refer to the above step 3.

In particular, as the UE-3 requests network connection services for non-IP communication (or for an unstructured type PDU session), it is determined to create a new PDU session for the UE-3. This is to determine to create a new PDU session for the UE-3 even if the DNN of the PDU session created for the UE-2 in the above steps 3 to 9 is the same as the DNN for which the UE-3 intends to receive service.

If the UE-1 created a PDU session for DNN #1 before the above step 2 and the PDU session was an unstructured type PDU session,

- In the above step 2, when the UE-2 sends a request message to the UE-1 to receive service for DNN #1, the UE-1 may determine to create a new PDU session for the UE-2.
- In the above step 12, when the UE-3 sends a request message to the UE-1 to receive service for DNN #1, the UE-1 may determine to create a new PDU session for the UE-3.

In the end, when a UE-to-Network Relay receives a request from a remote UE to receive network connection services through an unstructured type PDU session, the UE-to-Network Relay determines to always create a new PDU session. This may be interpreted as that one unstructured type of PDU session cannot service multiple UEs (These may be a UE-to-Network Relay and one or more remote UEs, or may be two or more remote UEs).

Steps 14-20. Refer to the contents described in the above steps 4 to 10 by replacing the UE-2 with the UE-3.

Step 21. The UE-2 sends uplink data to the UE-1. At this time, the source Layer-2 ID may be set to the Layer-2 ID of the UE-2 used by the UE-2 for the unicast link created with the UE-1 in the above step 2, and the destination Layer-2 ID may be set to the Layer-2 ID of the UE-1.

Step 22. The UE-1 (i.e., relay UE) checks to which PDU session the uplink data transmitted by the UE-2 is mapped. For this purpose, the context information described in the above step 10 is used.

The UE-1 (i.e., relay UE) transmits the uplink data to the network using the mapped PDU session, i.e., the PDU session created in the above step 3, i.e., the PDU session created for the UE-2.

Step 23. Downlink data is transmitted through the PDU session created for the UE-2, and this data is transmitted to the UE-1.

Step 24. The UE-1 (i.e., relay UE) checks to which unicast link the PDU session of the received data is mapped. For this purpose, the context information described in the above step 10 is used.

The UE-1 (i.e., relay UE) transmits the downlink data using the mapped unicast link, i.e., the unicast link created in the above step 2, i.e., the unicast link created with the UE-2.

Step 25. The UE-3 sends uplink data to the UE-1. In this case, the source Layer-2 ID is set to the Layer-2 ID of the UE-3 used by the UE-3 for the unicast link created with the UE-1 in the above step 12, and the destination Layer-2 ID is set to the Layer-2 ID of the UE-1.

Step 26. The UE-1 checks to which PDU session the uplink data transmitted by the UE-3 is mapped. For this, the context information described in the above step 20 is used.

The UE-1 transmits the uplink data to the network using the mapped PDU session, i.e., the PDU session created in the above step 13, i.e., the PDU session created for the UE-3.

Step 27. Downlink data is transmitted through the PDU session created for the UE-3, and this data is transmitted to the UE-1.

Step 28. The UE-1 checks to which unicast link the PDU session of the received data is mapped. For this, the context information described in the above step 20 is used.

The UE-1 transmits the downlink data using the mapped unicast link, i.e., the unicast link created in the above step 12, i.e., the unicast link created with the UE-3.

Although FIG. 10 shows that the SMF and UPF selected when creating a PDU session for the UE-2 and the SMF and UPF selected when creating a PDU session for the UE-3 are the same, different SMFs and/or UPFs may be selected.

II. Modifications of the First Disclosure

Based on the first disclosure, the following may be considered. Each process specified below is the same as each process in the first disclosure.

After the UE-2 requests network connection services for non-IP communication to the UE-1 for DNN #1 as in the above step 2 above, a scenario for requesting network connection services for non-IP communication to the UE-1 also for DNN #2 may be considered.

In this case, for DNN #2, a new unicast link different from the unicast link created in the above step 2 may be created with the UE-1, or the unicast link created in the above step 2 may be updated to fulfill the request for DNN #2. In the latter case, the existing unicast link can be updated by adding a PC5 QoS flow for DNN #2. The UE-1 creates a new PDU session for DNN #2 according to UE-2's request, and then adds information about the newly created PDU session to the context described in the above step 10. That is, the context is updated. In particular, the context may be configured for each PDU session ID. In particular, it is necessary to store information on the PC5 QoS flow for DNN #2 (the information g) described in the above step 10) by mapping with "a) PDU session ID".

Accordingly, when the UE-1 receives the uplink data transmitted through the unicast link from the UE-2, the UE-1 may determine whether this data is for DNN #1 (i.e., whether it is a PDU session for DNN #1), or for DNN #2 (i.e., whether it is a PDU session for DNN #2). Specifically, the data may be transmitted to the network through the corresponding PDU session by determining which PDU session, i.e., the PDU session ID, is mapped through the PFI (which may be included in the SDAP layer) indicated by the uplink data.

In addition, when the UE-1 receives downlink data destined for the UE-2 from the network, the UE-1 may determine to which unicast link the used PDU session is mapped, and furthermore, to which PC5 QoS flow is mapped in the corresponding unicast link. Thereafter, the data may be transmitted to the UE-2 using the PFI indicating the corresponding PC5 QoS flow through the corresponding unicast link.

III. Third Disclosure: A Method for a Remote UE to Transmit and Receive Non-IP Data Through a UE-to-Network Relay: Remote UE and UE-to-Network Relay is Connected in Multi-Hops FIGS. 11a and 11b are signal flow diagrams illustrating a method according to the third disclosure.

Figure 11A:
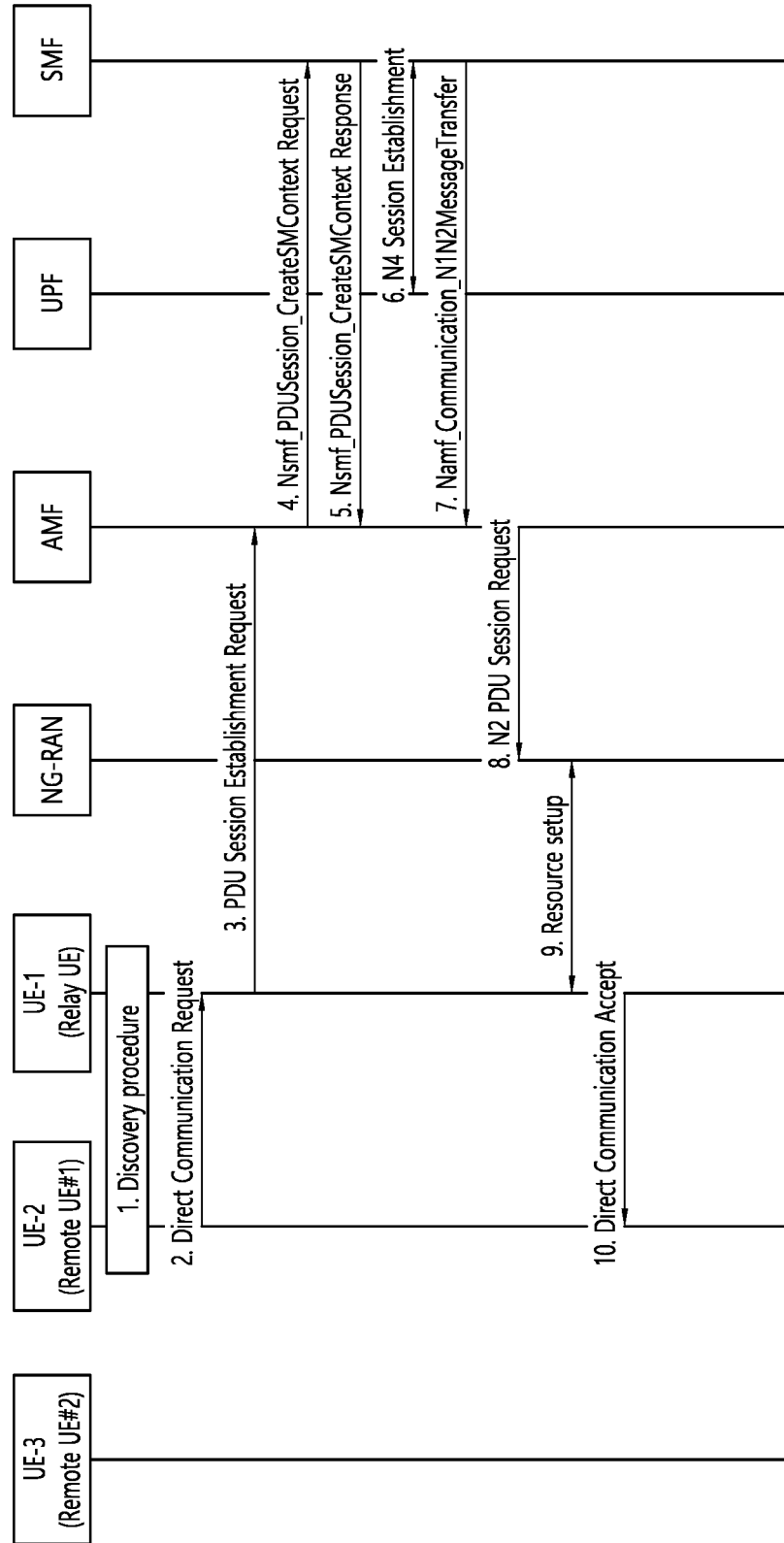
FIGS. 11a and 11b are signal flow diagrams illustrating a method according to the third disclosure.
Figure 11B:
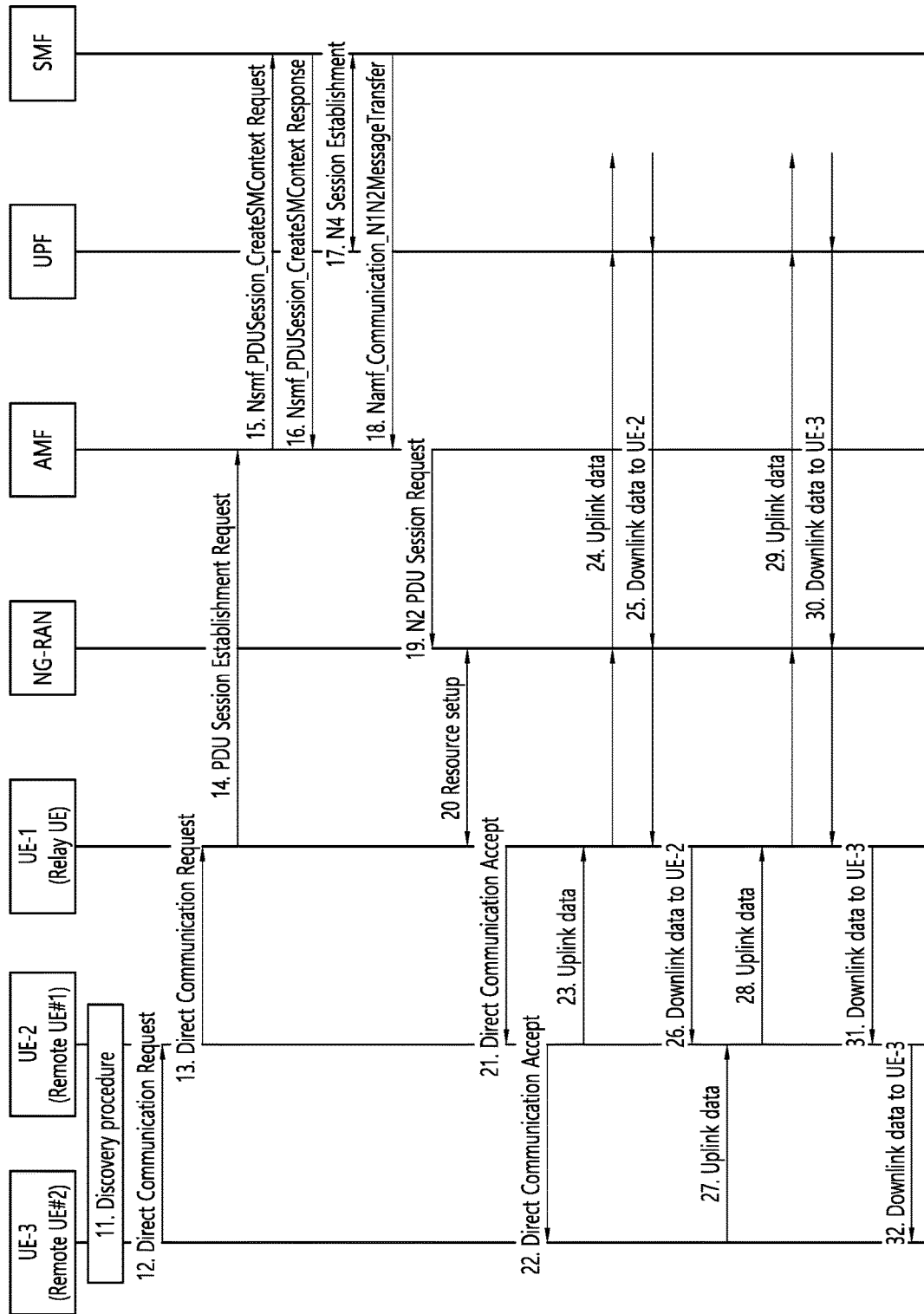

All steps shown in FIGS. 11a and 11b are not necessarily performed, and some steps may be omitted. However, for better understanding, most of the steps will be described below.

For the PDU session establishment process in FIGS. 11a and 11b, reference will be made to the contents of FIGS. 5a and 5b.

Steps 1-10. The description of the steps 1 to 10 of FIGS. 10a and 10b will be used as it is.

Step 11. The UE-3 (i.e., Remote UE #2) discovers a UE-to-Network Relay to receive network connection services. As a result, the UE-2 is selected as the Relay. However, the UE-2 cannot provide the network connection services in one-hop, but may provide the network connection services through another UE, i.e., the UE-1. Accordingly, such information may be provided to the UE-3. According to the information described in the step 1 of FIG. 10, information on whether the network connection services can be provided in one-hop (or information about how many hops the network connection services can be provided in general) may be used.

It can be understood and interpreted that network connection services are received through multi-hop based on the details described in the step 1 of FIG. 10.

As it is assumed that the UE-2 has already received network connection services from the UE-1 by a one-hop through the above steps 1 to 10, so it is assumed that it is possible to provide network connection services to the UE-3 through the UE-1. Alternatively, as the UE-3 discovers a UE-to-Network Relay, the UE-2 may discover a UE-to-Network Relay.

In addition, the UE-2 may serve as an Intermediate Relay that provides a relay operation to the UE-3 at the same time as a remote UE that also receives network connection services itself. Alternatively, the UE-2 may perform only role of an Intermediate Relay that provides a relay operation to the UE-3 without receiving network connection services.

Step 12. The UE-3 transmits a request message for unicast link setup, i.e., a direct communication request message, to receive network connection services through the UE-2.

For detailed operation, refer to the step 2 of FIG. 10.

Step 13. Based on the direct communication request message received from the UE-3, the UE-2 transmits a request message for unicast link setup, i.e., a direct communication request message, to receive network connection services from the UE-1 for the UE-3.

The direct communication request message may be the direct communication request message itself transmitted from the UE-3. Alternatively, it may be the form of a message including the direct communication request message itself transmitted from the UE-3 and information generated by the UE-2 itself. Alternatively, it may be the form of a message including all or part of information included in the direct communication request message transmitted from the UE-3 and information generated by the UE-2 itself.

When the UE-2 includes the information generated by the UE-2 in the direct communication request message, one or more of the following information may be included.

a) Information indicating that the UE-2 operates as an Intermediate Relay UE.

b) Identifier information indicating an Intermediate Relay UE, i.e., the UE-2.

The identifier information indicating the Intermediate Relay UE may be one or more of the following.

b-1) Subscription Permanent Identifier (SUPI)

b-2) Subscription Concealed Identifier (SUCI)

b-3) Generic Public Subscription Identifier (GPSI)

b-4) Permanent Equipment Identifier (PEI)

b-5) MSISDN b-6) ID that can be used when the UE operates as an Intermediate Relay UE: Let this be an Intermediate Relay UE-specific identifier. For this Intermediate Relay UE-specific identifier, a different ID may be used for each DNN, or a single ID may be used for all DNNs. Also, the Intermediate Relay UE-specific identifier may include HPLMN information of the UE. A portion other than the HPLMN information may be in an encrypted form.

c) Hop related information of the remote UE, i.e., the UE-3.

This is information that enables the UE-to-Network Relay, i.e., the UE-1, to know how many hops it is from the remote UE, the UE-3. For example, if the UE-2 includes 2 as the above information, it can be seen that the UE-1 provides network connection services to the UE-3 by 2 hops.

When there are multiple Intermediate Relay UEs, each Intermediate Relay UE may increment the information by 1 each time it receives and transmits a direct communication request message toward a UE-to-Network Relay. For example, in the case of remote UE<→Intermediate Relay #1<→Intermediate Relay #2<→UE-to-Network Relay, Intermediate relay #1 may include 2 as the above information, and Intermediate Relay #2 may include 3 as the above information.

Step 14. When the direct communication request message received from the UE-2 includes the "c) Hop related information of the remote UE" of the above step 13, the UE-1 may perform check/authentication for whether network connection services can be provided to the remote UE based on this information. If the UE-1 is configured to be able to provide network connection services to a remote UE up to 3 hops away, but the remote UE is 4 hops away, the UE-1 may reject the request. The above check/authentication may be performed by the network. The maximum number of hops for the UE-to-Network Relay to provide the network connection services may be configured for each DNN. The above check/authentication may be performed only when "c) Hop-related information of the remote UE" indicates multi-hops, i.e., hops greater than one.

Based on the direct communication request message received from the UE-2, the UE-1 creates a PDU session for the DNN to which the UE-3 wants to be provided with network connection services. Accordingly, a PDU session establishment request message is transmitted to the network.

For detailed operation, refer to the step 3 of FIG. 10.

In particular, as described with reference to FIG. 10, upon receiving a network connection service request for non-IP communication (or for an unstructured type PDU session), it is determined to create a new PDU session. This is to determine to create a new PDU session for the UE-3 even if the DNN of the PDU session created for the UE-2 in the above steps 3 to 9 is the same as the DNN for which the UE-3 intends to receive service.

If the UE-1 created a PDU session for DNN #1 before the above step 2 and the PDU session was an unstructured type PDU session, In the above step 2, when the UE-2 sends a request message to the UE-1 to receive service for DNN #1, the UE-1 may determine to create a new PDU session for the UE-2.

In the above step 13, when the UE-2 sends a request message to the UE-1 to receive service for DNN #1 on behalf of the UE-3, the UE-1 may determine to create a new PDU session for the UE-2.

In the end, when a UE-to-Network Relay receives a request from a remote UE to receive network connection services through an unstructured type PDU session, the UE-to-Network Relay determines to always create a new PDU session. This may be interpreted as that one unstructured type of PDU session cannot service multiple UEs (These may be a UE-to-Network Relay and one or more remote UEs, or may be two or more remote UEs).

Steps 15-20. Replace the UE-2 with the UE-3 and refer to the contents described in the above steps 4 to 9.

Step 21. The UE-1 transmits to the UE-2 a response to the unicast link setup requested in the above step 13, i.e., a direct communication accept message. This message may include information indicating that a PDU session has been created. In addition, this message may include hop related information of the remote UE.

Immediately after the above step 13, the UE-1 may once transmit to the UE-2 a response stating that the unicast link setup request has been successfully received, and then, when a PDU session is created, the UE-1 may transmit a direct communication accept message to the UE-2.

Alternatively, the UE-1 may transmit a direct communication accept message to the UE-2 immediately after the above step 13. Thereafter, in step 21, a message indicating that the PDU session has been created may be transmitted.

Alternatively, the UE-1 may transmit a direct communication accept message to the UE-2 immediately after the above step 13.

Upon receiving the message from the UE-1, the UE-2 may immediately transmit a corresponding message to the UE-3, or may transmit a response message to the UE-3 after receiving the information that the PDU session is finally created.

If the UE-3 has sent uplink data but the UE-1 has not yet created a PDU session for the UE-3, the UE-1 may store the data and transmit after the PDU session is created.

As the UE-1 creates a PDU session for the UE-3, context is stored. The UE-1 specifically needs to store information about which PDU session is mapped to which unicast link. The context includes one or more of the following information.

a) PDU session ID:

This is created by the UE-1 to request PDU session establishment.

b) Unicast link identifier information:

This is information for identifying the created unicast link, and may be a PC5 link identifier or a newly defined ID.

Identifier information about the unicast link created with the UE-2.

c) Identifier information indicating the remote UE:

It is identifier information indicating the UE-3.

d) Its own Layer-2 ID:

This is the Layer-2 ID of the UE-1 used for the created unicast link.

e) Layer-2 ID of unicast link partner/peer UE:

This is the Layer-2 ID of the UE-2 used for the created unicast link. This may be obtained in the discovery process of the above step 1, or may be obtained from the Layer-2 ID used by the UE-2 to transmit the direct communication request message in the above step 2.

f) Information indicating that it is a unicast link for non-IP communication g) Set of PC5 QoS Flow Identifiers (PFIs). Each PFI is associated with a QoS parameter (i.e., PC5 5QI (PQI)).

In the case of an unstructured PDU session, as only one QoS flow is supported, it may be information about one PC5 QoS flow.

h) PC5 QoS flow ID of unicast link mapped with QoS flow ID of PDU session i) DNN information (this may include slice-related information)

j) In addition to the above, necessary information related to the unicast link k) Information related to hops with the remote UE.

Figure 2:
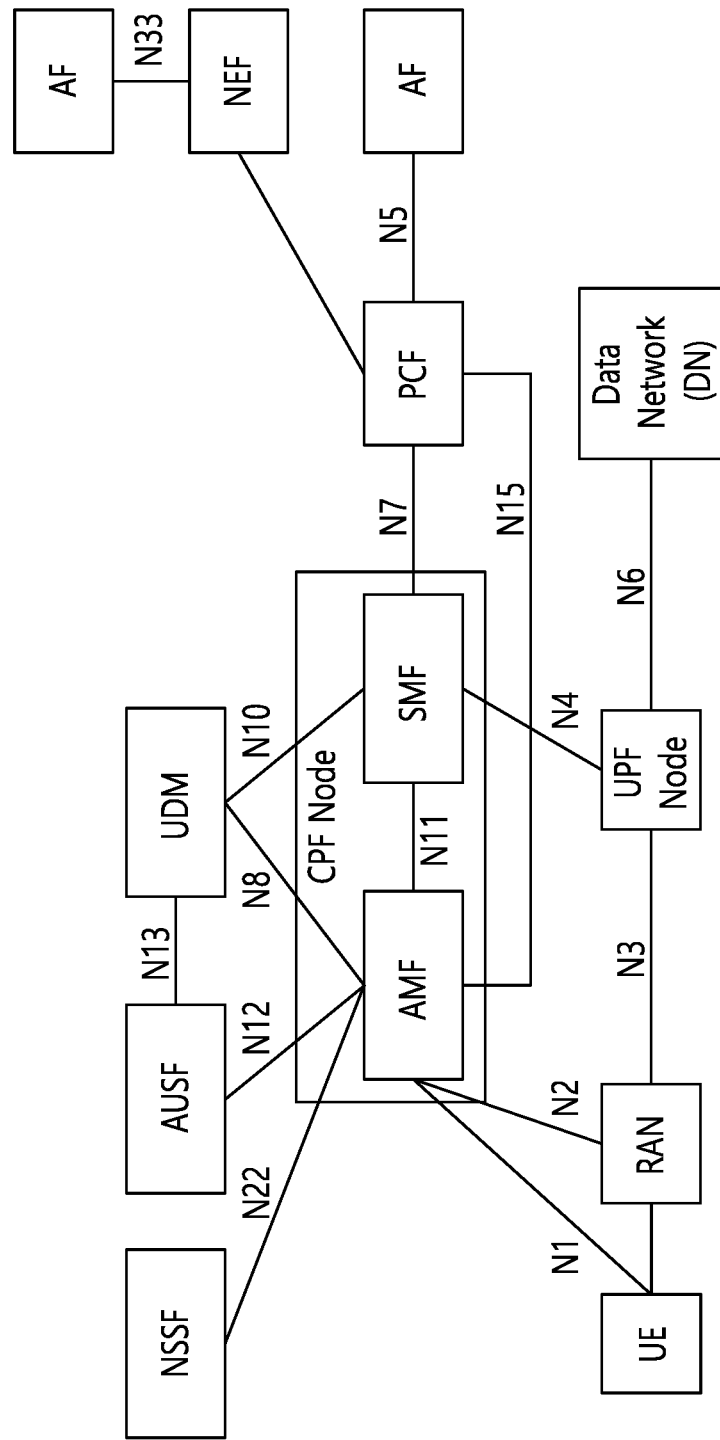
FIG. 2 is an exemplary diagram illustrating a predicted structure of a next generation mobile communication in terms of a node.
Figure 3:
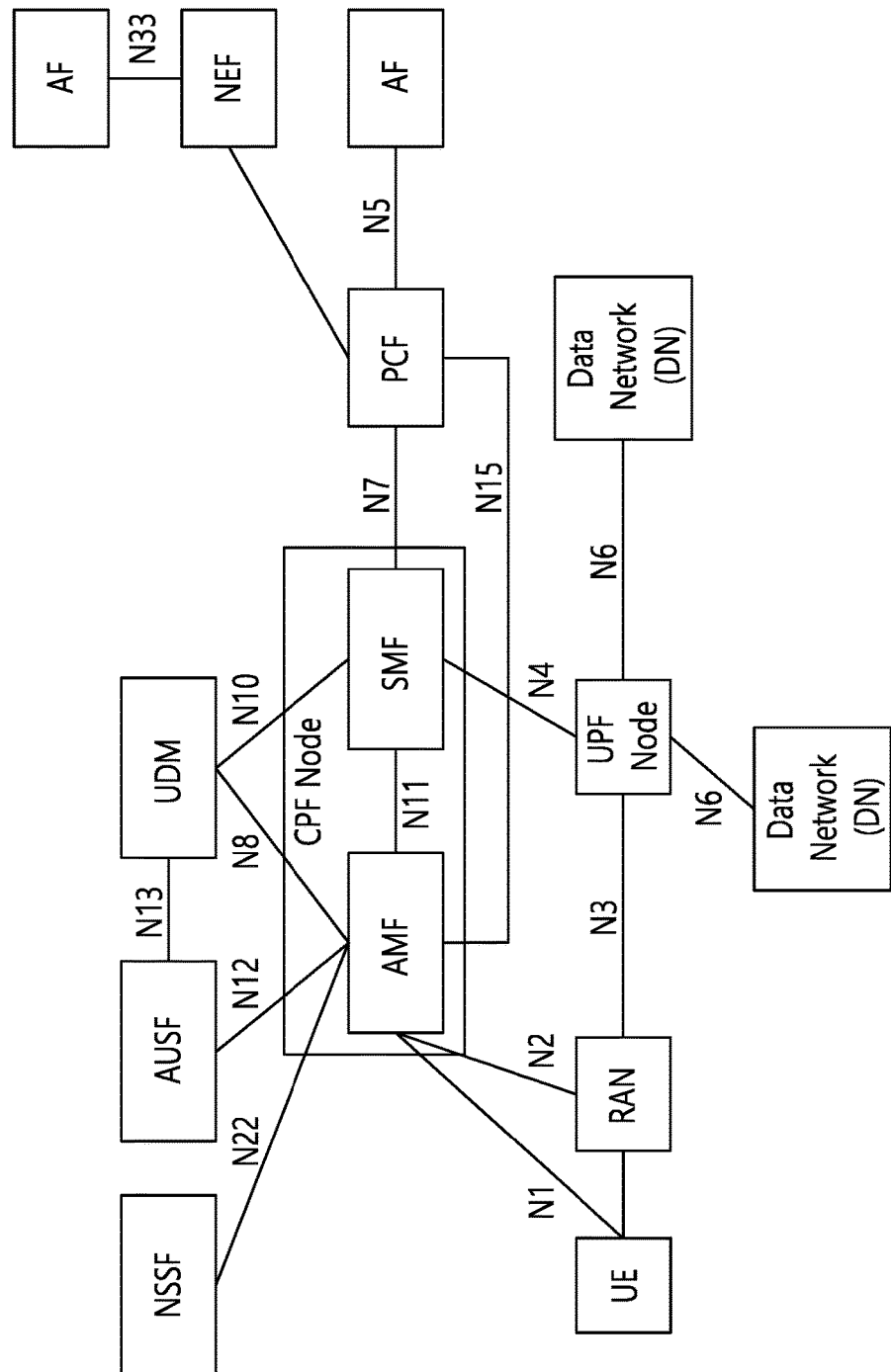
FIG. 3 is an exemplary diagram illustrating an architecture for supporting simultaneously access two data networks.
Figure 4:
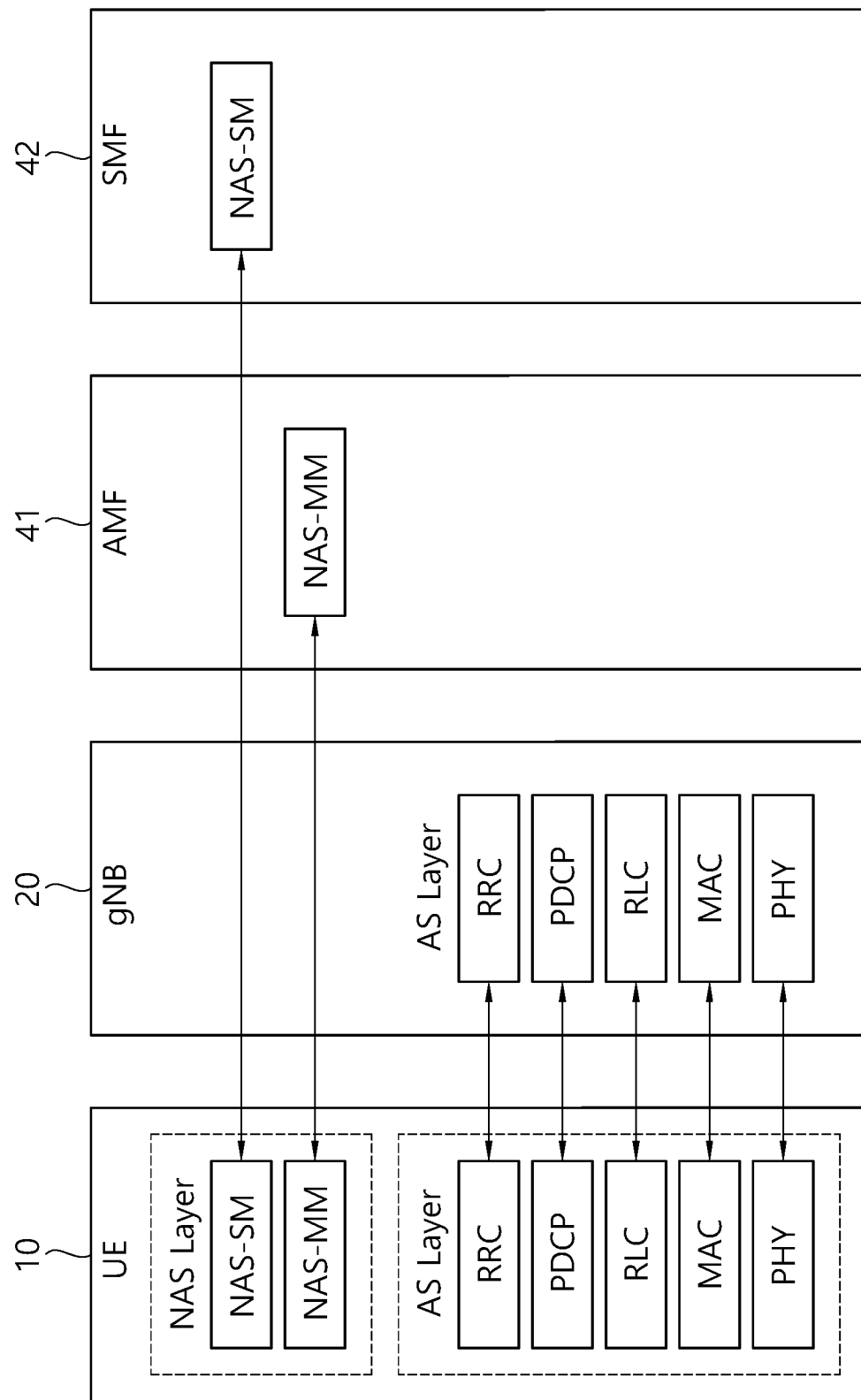
FIG. 4 is another exemplary diagram showing a structure of a radio interface protocol between a UE and a gNB.

Information about how many hops away from the remote UE, and it may be 2 in case of FIG. 2.

l) Identifier information indicating the Intermediate Relay UE:

It is identifier information indicating the UE-2.

If a plurality of Intermediate Relay UEs exist, identifier information indicating all Intermediate Relay UEs may be stored.

It can be understood that the UE-1 stores all necessary information related to the unicast link created with the UE-2. In particular, since the created unicast link is for providing network connection services for other UEs, it can be understood that information about a related PDU session (the information a) above) should be stored together.

It can be understood that the UE-2 also stores all necessary information related to the unicast link created with the UE-1. This may be information except for the information a) in the information stored by the UE-1. In the case of "e) Layer-2 ID of unicast link partner/peer UE" among the above information, it may be obtained in the discovery process of the above step 1, or may be obtained from the Layer-2 ID used by the UE-1 to transmit the direct communication accept message in step 21.

When specific information is updated in the context stored by the UE in relation to the unicast link, it is updated and stored. For example, when the Layer-2 ID (Layer-2 ID of the UE-1, Layer-2 ID of the UE-2) may be updated.

Step 22. Based on the direct communication accept message received from the UE-1, the UE-2 transmits to the UE-3 a response to the unicast link setup requested in the above step 12, i.e., a direct communication accept message.

The direct communication accept message may be the direct communication acceptance message itself transmitted from the UE-1. Alternatively, it may be the form of a message that includes the direct communication accept message itself transmitted from the UE-1 and includes information generated by the UE-2 itself. Alternatively, it may be the form of a message including all or part of information included in the direct communication accept message transmitted from the UE-1, and information generated by the UE-2 itself.

Immediately after the above step 12, the UE-2 may once transmit to the UE-3 a response stating that the unicast link setup request has been successfully received, and then, upon receiving a direct communication accept message from the UE-1, the UE-2 may transmit a direct communication accept message to the UE-3.

Alternatively, the UE-2 may transmit a direct communication accept message to the UE-3 immediately after the above step 12. Thereafter, in step 22, a message indicating that the PDU session has been created may be transmitted.

Alternatively, the UE-2 may transmit a direct communication accept message to the UE-3 immediately after the above step 12.

As the UE-2 creates a unicast link with the UE-3, context is stored. In particular, the UE-2 needs to store information on whether the unicast link created with the UE-3 is mapped with the unicast link created with the UE-1 in the above step 13. Accordingly, the context includes one or more of the following information.

a) ID information of the unicast link created with the UE-1:

This is the identifier information of the unicast link created with the UE-1 by the above step 13.

Although FIG. 11 shows that the remote UE is connected to a UE-to-Network Relay by a distance of two hops, it may be generalized to a case of more than three hops. In this case, in the case of an Intermediate Relay UE, it can be understood that the identifier information of the unicast link created with the UE in the uplink direction toward the network is stored. Or, in the case of creating the unicast link with the UE-to-Network Relay, it can be understood that identifier information of the unicast link created with the UE-to-Network Relay is stored. Accordingly, the above information a) can be understood as "identifier information of an uplink direction unicast link".

b) ID information of the unicast link created with the UE-3:

This is information for identifying the unicast link created with the UE-3, and may be a PC5 link identifier or a newly defined ID.

Although FIG. 11 shows that the remote UE is connected to a UE-to-Network Relay by a distance of two hops, it may be generalized to a case of more than three hops. In this case, in the case of an Intermediate Relay UE, it can be understood that the identifier information of the unicast link created with the UE in the downlink direction toward the remote UE is stored. Or, in the case of creating the unicast link with the remote UE, it can be understood that identifier information of the unicast link created with the remote UE is stored. Accordingly, the above information b) can be understood as "identifier information of a downlink direction unicast link".

c) Identifier information indicating the remote UE:

It is identifier information indicating the UE-3.

d) Its own Layer-2 ID:

This is the Layer-2 ID of the UE-2 used for the created unicast link.

e) Layer-2 ID of unicast link partner/peer UE:

This is the Layer-2 ID of the UE-3 used for the created unicast link. This may be obtained in the discovery process in the above step 11, or may be obtained from the Layer-2 ID used by the UE-3 to transmit the direct communication request message in the above step 12.

f) Information indicating that it is a unicast link for non-IP communication g) Set of PC5 QoS Flow Identifiers (PFIs). Each PFI is associated with a QoS parameter (i.e., PC5 5QI (PQI)).

In the case of an unstructured PDU session, as only one QoS flow is supported, it may be information about one PC5 QoS flow.

h) PC5 QoS flow mapping relationship between two unicast links.

That is, mapping information between the PFI of the unicast link created with the UE-1 and the PFI of the unicast link created with the UE-3.

i) DNN information (this may include slice-related information)

j) In addition to the above, necessary information related to the unicast link k) information related to hops with the remote UE.

Information on how many hops away from the remote UE is, and it may be 1 in the case of FIG. 11.

It can be understood that the UE-2 stores all necessary information related to the unicast link created with the UE-3.

It can be understood that the UE-3 also stores all necessary information related to the unicast link created with the UE-2. This can be understood as storing information necessary for remote UE operation among the information stored by the UE-2. In the case of "e) Layer-2 ID of unicast link partner/peer UE" among the above information, it may be obtained in the discovery process in the above step 11, or it may also be obtained from Layer-2 ID used by the UE-2 to transmit the direct communication accept message in the above step 22.

When specific information is updated in the context stored by the UE in relation to the unicast link, it is updated and stored. For example, when the Layer-2 ID (Layer-2 ID of the UE-2, Layer-2 ID of the UE-3) is updated, the Layer-2 ID may be updated and stored.

Step 23. The UE-2 sends uplink data to the UE-1. At this time, the source Layer-2 ID is set to the Layer-2 ID of the UE-2 used by the UE-2 for the unicast link created with the UE-1 in the above step 2, and the destination Layer-2 ID is set to the Layer-2 ID of the UE-1.

Step 24. The UE-1 checks to which PDU session the uplink data transmitted by the UE-2 is mapped. For this purpose, the context information described in the above step 10 is used.

The UE-1 transmits the uplink data to the network using the mapped PDU session, i.e., the PDU session created in the above step 3, that is, the PDU session created for the UE-2.

Step 25. Downlink data is transmitted through the PDU session created for the UE-2, and the data is transmitted to the UE-1.

Step 26. The UE-1 checks to which unicast link the PDU session of the received data is mapped. For this purpose, the context information described in the above step 10 is used.

The UE-1 transmits the downlink data using the mapped unicast link, i.e., the unicast link created in the above step 2, i.e., the unicast link created with the UE-2.

Step 27. The UE-3 sends uplink data to the UE-2. In this case, the source Layer-2 ID is set to the Layer-2 ID of the UE-3 used by the UE-3 for the unicast link created with the UE-2 in the above step 12, and the destination Layer-2 ID is Set to the Layer-2 ID of the UE-2.

Step 28. The UE-2 checks to which uplink direction unicast link the uplink data transmitted by the UE-3 is mapped. For this purpose, the context information described in the above steps 21 and 22 is used.

The UE-2 transmits the uplink data to the UE-1 using the mapped uplink direction unicast link, i.e., the unicast link created with the UE-1 in the above step 13.

Step 29. The UE-1 checks to which PDU session the uplink data transmitted by the UE-2 is mapped. For this, the context information described in the above step 21 is used.

The UE-1 transmits the uplink data to the network using the mapped PDU session, i.e., the PDU session created in the above step 14, i.e., the PDU session created for the UE-3.

Step 30. Downlink data is transmitted through the PDU session created for the UE-3, and the data is transmitted to the UE-1.

Step 31. The UE-1 checks to which unicast link the PDU session of the received data is mapped. For this, the context information described in the above step 21 is used.

The UE-1 transmits the downlink data using the mapped unicast link, i.e., the unicast link created in the above step 13, i.e., the unicast link created with the UE-2.

Step 32. The UE-2 checks to which downlink direction unicast link the downlink data transmitted by the UE-1 is mapped. For this purpose, the context information described in the above steps 21 and 22 is used.

The UE-2 transmits the downlink data to the UE-3 using the mapped downlink direction unicast link, i.e., the unicast link created with the UE-3 in the above step 12.

FIG. 11 shows that the SMF and UPF selected when creating a PDU session for the UE-2 and the SMF and UPF selected when creating a PDU session for the UE-3 are the same, but different SMFs and/or UPFs may be selected.

Figure 12A:
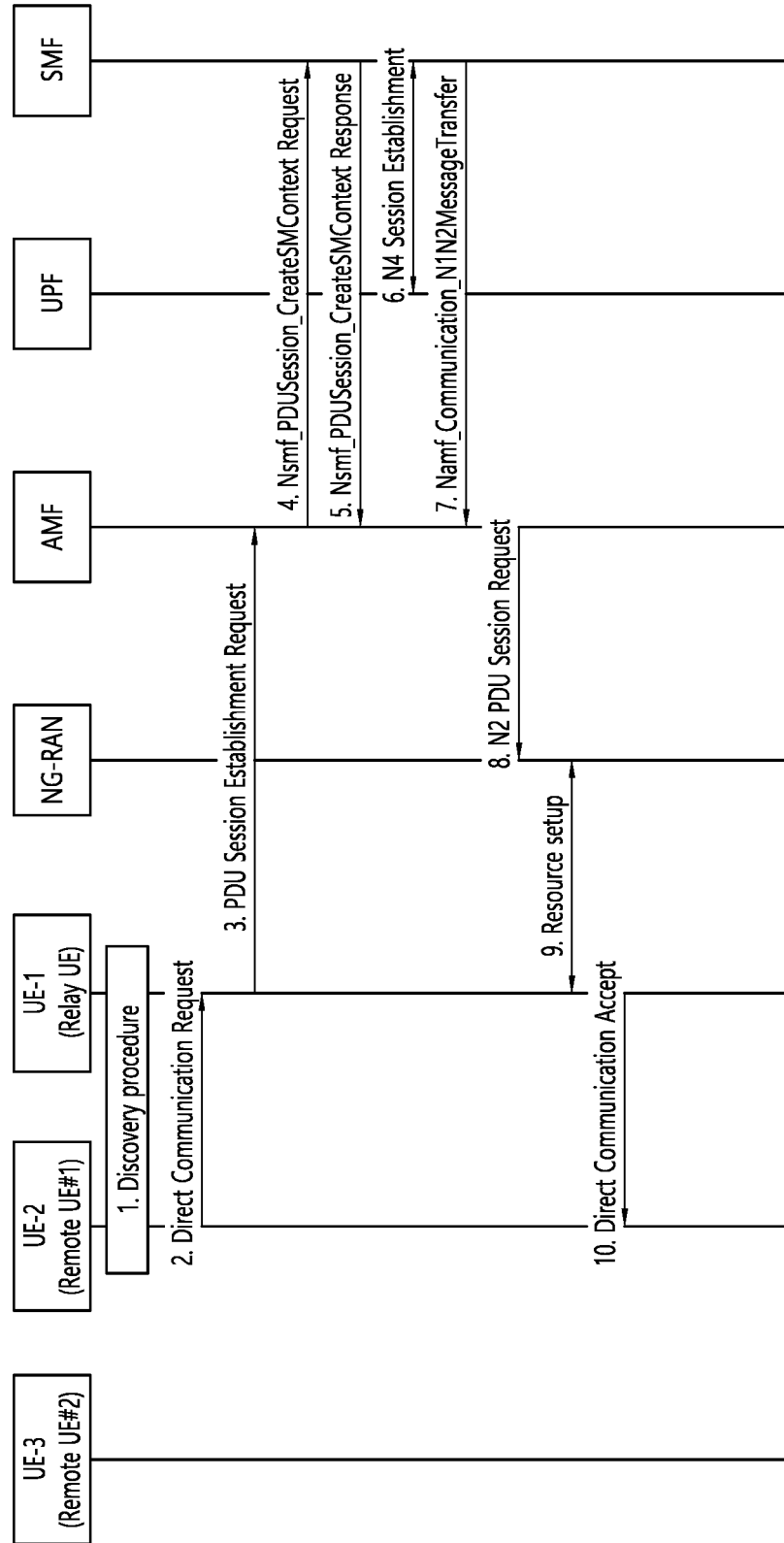
FIGS. 12a and 12b are signal flow diagrams illustrating a method according to the fourth disclosure.
Figure 12B:
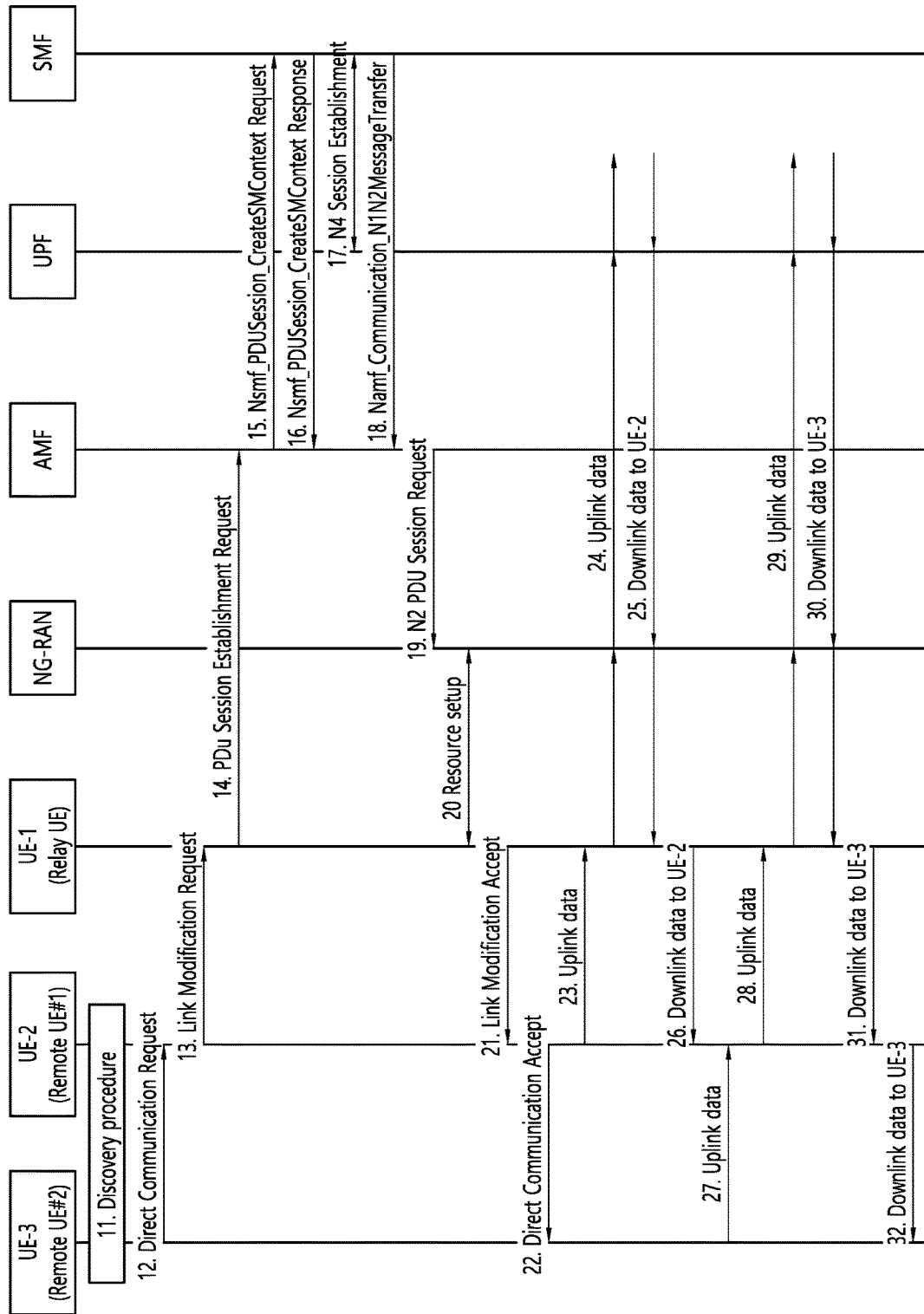

IV. Fourth Disclosure:

FIGS. 12a and 12b are signal flow diagrams illustrating a method according to the fourth disclosure.

All steps shown in FIGS. 12a and 12b are not necessarily performed, and some steps may be omitted. However, for better understanding, most of the steps will be described below.

The main difference between FIGS. 12a and 12b compared to FIGS. 11a and 11b is step 13 and step 21. Accordingly, the following description will focus on the content that is different from those of FIGS. 11a and 11b, and the contents described with reference to FIGS. 11a and 11b will be used for the same part.

Step 13. Based on the direct communication request message received from the UE-3 (i.e., remote UE #2), the UE-2 (i.e., remote UE #1) determines to receive network connection services from the UE-1 (i.e., Relay UE).

As the UE-2 has already created a unicast link with the UE-1 in the above step 2, the UE-2 determines to perform the request received from the UE-3 by updating this unicast link. Accordingly, the UE-2 transmits a message for updating the unicast link, i.e., a link modification request message, to the UE-1.

The link modification request message may be used by modifying/extending an existing link modification request message, or a new PC5-S message may be defined and used.

The link modification request message may be the form of a message including the direct communication request message itself transmitted from the UE-3 and information generated by the UE-2 itself. Alternatively, it may be the form of a message including all or part of information included in the direct communication request message transmitted from the UE-3 and information generated by the UE-2 itself.

When the UE-2 includes the information generated by the UE-2 itself in the link modification request message, reference is made to the description of step 13 of FIG. 11.

In particular, the link modification request message includes information on the added PC5 QoS flow in which the request of the UE-3 is reflected. This may be the form of mapping with DNN-related information.

Step 14. Step 14 of FIG. 11 may be interpreted by replacing the direct communication request message with the link modification request message.

Step 21. The UE-1 transmits to the UE-2 a response to the unicast link update requested in the above step 13, i.e., a link modification accept message. This message may include information indicating that a PDU session has been created. In addition, this message may include hop related information of the remote UE.

The UE-1 (i.e., Relay UE) creates a new PDU session for the UE-3, and then performs an operation of adding information on the newly created PDU session to the context described in the above step 10. That is, the context is updated. In particular, the context may be configured for each PDU session ID. In particular, it is necessary for the UE-1 (i.e., Relay UE) to map information about the PC5 QoS flow for the UE-3 (this is the information g) described in the above step 10) to "a) PDU session ID" and store it.

Accordingly, when the UE-1 receives uplink data transmitted through the unicast link from the UE-2, the UE-1 may decide whether the data is for a PDU session created for the UE-2 or for a PDU session created for the UE-3. Specifically, the data can be transmitted to the network through the corresponding PDU session by determining to which PDU session, i.e., the PDU session ID, is mapped through the PFI (which may be included in the SDAP layer) indicated by the uplink data.

In addition, when the UE-1 receives downlink data destined for the UE-2 or the UE-3 from the network, the UE-1 may decide to which unicast link the used PDU session is mapped, and further to which PC5 QoS flow in the corresponding unicast link. Thereafter, the UE-1 may transmit the data to the UE-2 using the PFI indicating the corresponding PC5 QoS flow through the corresponding unicast link. Then, based on the PC5 QoS flow information, the UE-2 distinguishes between downlink data transmitted to itself and downlink data to be delivered to the UE-3, and in the latter case, sends downlink data to the UE-3.

The operations of the steps 23 to 32 showing uplink data transmission and downlink data transmission may be interpreted based on the above description.

V. Summary of First to Fourth Disclosures

A UE capable of operating as a UE-to-Network Relay may register to the network and may establish a PDU session for traffic relay. In addition, the UE may establish a new PDU session or use an existing PDU session in order to provide relay traffic towards remote UEs.

PDU sessions supporting the UE-to-Network Relay may only be used to relay traffic of the remote UE(s).

In particular, when the remote UE requests network connection services of unstructured traffic, i.e., relay, the UE establishes a new unstructured type PDU session to support relay of the traffic.

Figure 13:
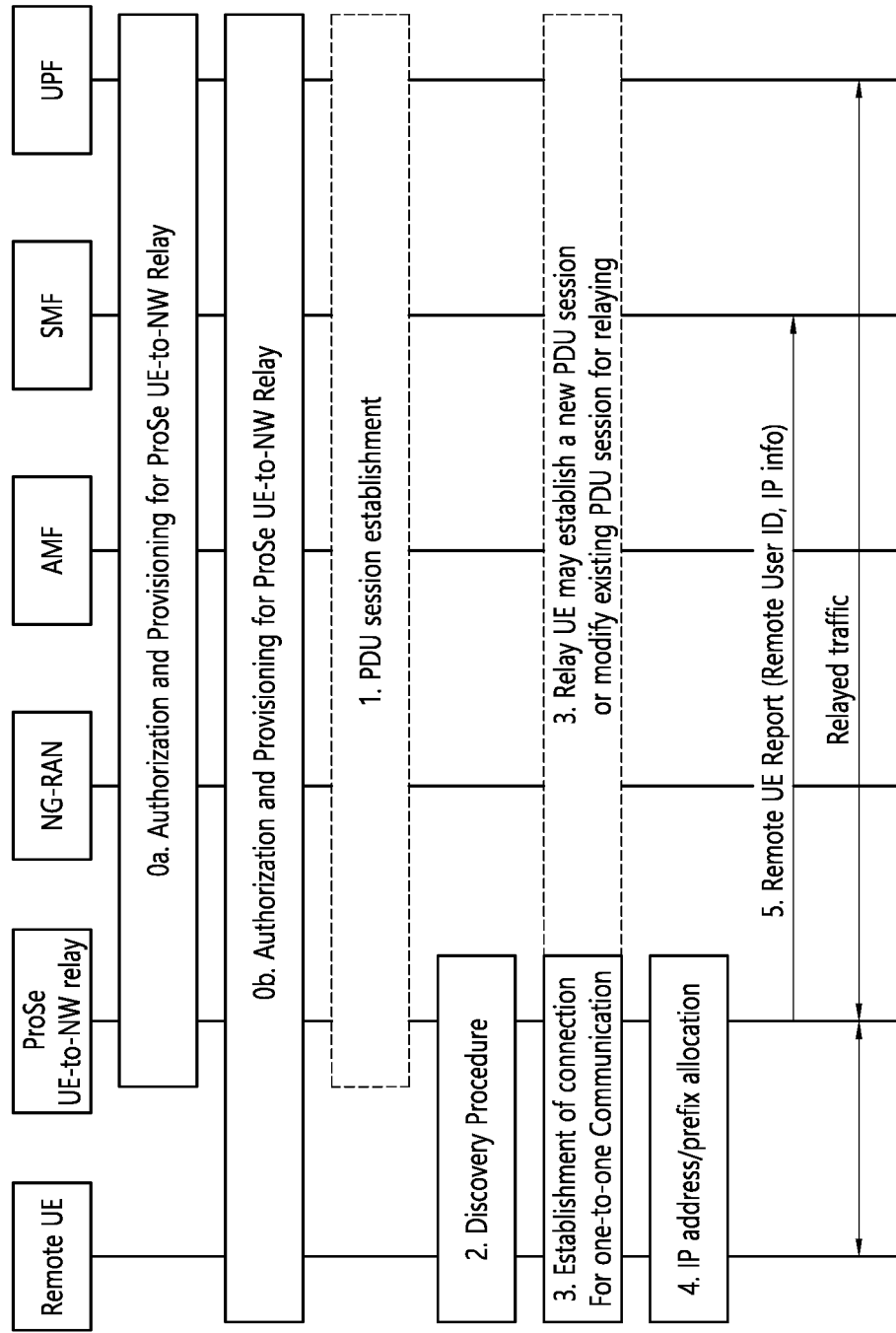
FIG. 13 is a signal flow diagram illustrating a procedure for relaying IP traffic.

FIG. 13 is a signal flow diagram illustrating a procedure for relaying IP traffic.

Step 0. During the registration procedure, authorization and provisioning is performed between the UE-to-Network Relay and the remote UE.

Step 1. The UE-to-Network Relay may establish a PDU session for relaying with default PDU session parameters. Or, the UE-to-Network Relay may establish a PDU session with per-configured PDU session parameters. The parameters may include S-NSSAI, DNN, SSC mode.

In case of IPv6, the UE-to-Network Relay may obtain an IPv6 prefix from the network.

Step 2. Based on the authorization and provisioning in the above step 0, the Remote UE may discovery the UE-to-Network Relay.

Step 3. The remote UE may select a UE-to-Network Relay and establish a connection for one-to-one ProSe direct communication.

If there is no PDU session satisfying the requirements of the PC5 connection with the remote UE (e.g., S-NSSAI, DNN, QoS), the UE-to-Network Relay may perform a new PDU session establishment procedure or modification procedure for relaying.

Step 4. An IPv6 or IPv4 address may be allocated for the remote UE.

Step 5. The UE-to-Network Relay transmits a remote UE report message (including (remote user ID, IP information) to the SMF for the PDU session associated with the relay.

The remote user ID is an ID identifying the remote UE user that was successfully connected in the above step 3. The SMF stores the remote user ID and related IP information of the UE-to-Network Relay.

For IP information, the following principles may apply.
For IPv4, the UE-to-Network Relay may report TCP/UDP ports assigned to individual remote UEs.
For IPv6, the UE-to-Network Relay may report the IPv6 prefix assigned to individual remote UE.

The remote UE report message may be sent when the remote UE disconnects from the UE-to-Network Relay (e.g., upon explicit layer-2 link release or based on the absence of keep alive messages over PC5) to inform the SMF that the remote UE has left.

In the case of registration update procedure involving SMF change, the remote user ID and related IP information corresponding to the remote UE may be transferred to the new SMF as part of the SM context transfer.

Note 1: In order for the SMF to have the remote UE information, the HPLMN and the VPLMN where the UE-to-Network Relay is authorized to operate, needs to support the transfer of the remote UE related parameters in case the SMF is in the HPLMN.

After being connected to the UE-to-Network Relay, the remote UE may measure the signal strength of the discovery signal sent by the UE-to-Network Relay.

To support non-IP traffic by the UE-to-Network Relay, the following principles may be applied.
Unstructured type PDU session is used to support non-IP traffic.
The UE-to-Network Relay establishes an unstructured type PDU session for each remote UE to support relaying non-IP traffic from the remote UE.

This may be interpreted as that the UE-to-Network Relay dedicatedly or individually creating an unstructured type PDU session for a remote UE. More specifically, it may be interpreted as that the UE-to-Network Relay creates dedicatedly or individually an unstructured type PDU session for each remote UE for each DNN+S-NSSAI.

After establishing an unstructured type PDU session for the remote UE and a layer-2 link with the remote UE, the UE-to-Network Relay may store the mapping information between the layer-2 link identified by the PC5 link Identifier and the PDU session identified by the PDU session ID.
The UE-to-Network Relay may relay traffic from the remote UE based on the mapping information between the layer-2 link and the PDU session.

Figure 14:
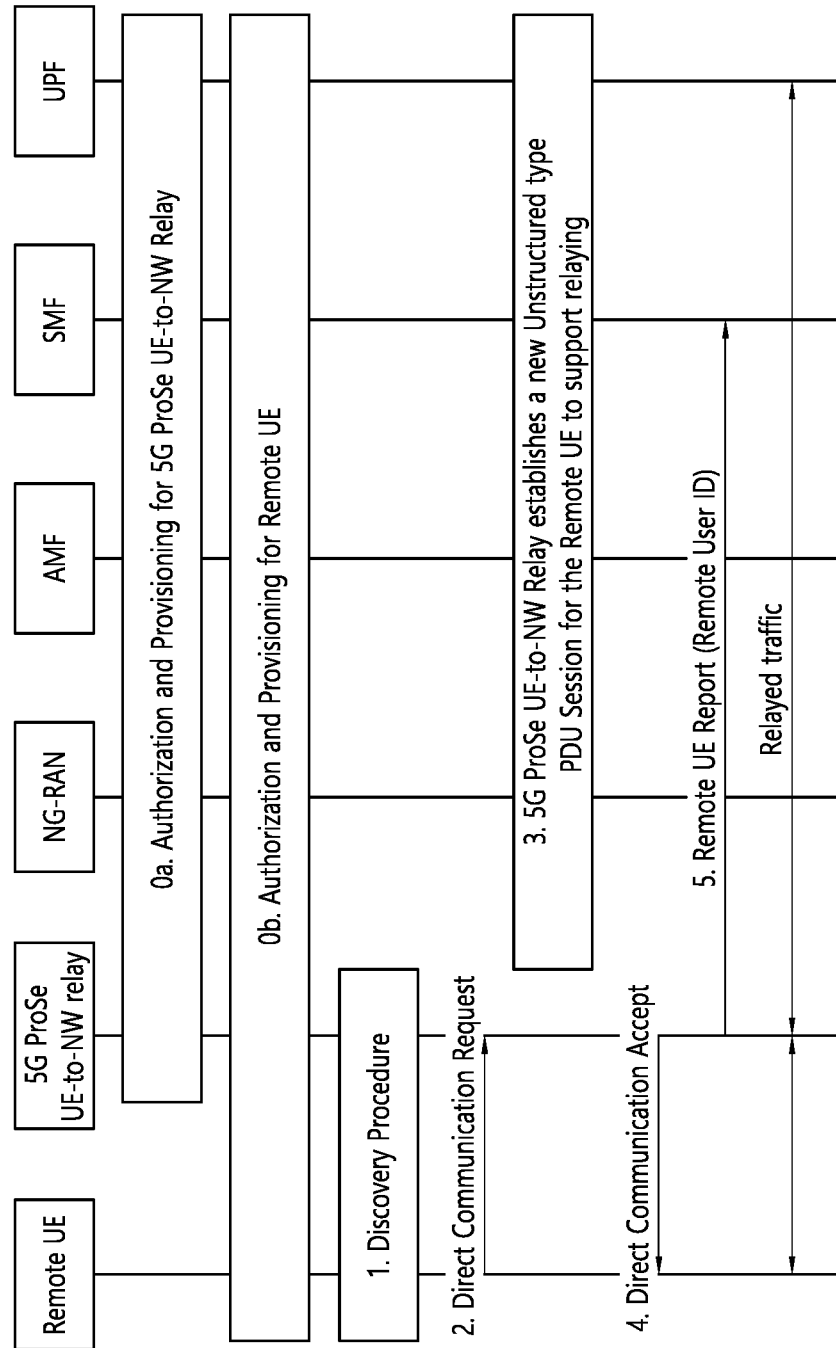
FIG. 14 is a signal flow diagram illustrating a procedure for relaying non-IP traffic.

FIG. 14 is a signal flow diagram illustrating a procedure for relaying non-IP traffic.

A UE capable of operating as a UE-to-Network Relay may register to the network. A PDU session supporting the UE-to-Network Relay may be used to relay traffic of the remote UE.

Step 0. During the registration procedure, authorization and provisioning is performed between the UE-to-Network Relay and the remote UE.

Step 1. Based on the authorization and provisioning, the remote UE may discover a UE-to-Network Relay. As part of the discovery procedure, the remote UE may acquire information on the connectivity service the UE-to-Network Relay provides.

Step 2. The remote UE may select the UE-to-Network Relay. Then, the remote UE may send a direct communication request message to the UE-to-Network Relay in order to establish one-to-one ProSe direct communication for non-IP communication. That is, when the connection for one-to-one ProSe direct communication, i.e., a Layer-2 link is established, the IP address configuration may not be exchanged between the remote UE and the UE-to-Network Relay.

Step 3. The UE-to-Network Relay may decide to establish an unstructured type PDU session based on the type of Layer-2 link established with the remote UE, S-NSSAI, DNN, and QoS, and then, may perform a new PDU session establishment procedure.

Step 4. The UE-to-Network Relay may send a direct communication accept message to the remote UE. The UE-to-Network Relay may store mapping information between the layer-2 link with the remote UE identified by the PC5 link identifier and the PDU session identified by the PDU session ID.

The UE-to-Network Relay may include a PDU session ID for the PDU session in the direct communication accept message.

Meanwhile, through step 4, relay of uplink data and downlink data may start. Specifically, the UE-to-Network Relay may relay the traffic for the remote UE based on the mapping information between the layer-2 link and the PDU session.

Step 5. The UE-to-Network Relay may send a remote UE report message (including remote user ID) to the SMF for the PDU session associated with the relay for the remote UE. The remote user ID is the user ID of the remote UE that was successfully connected in the above step 2. The SMF may store the remote user ID in the SM context for the PDU session.

The remote UE report message may include PDU session ID information. The PDU session ID information may be explicit or implicit. The PDU session ID information may be included in an AMF-interpretable NAS message and/or an SMF-interpretable SM NAS message.

The UE-to-Network Relay may perform the release procedure for the PDU session established for the remote UE when the remote UE tries to disconnect from the UE-to-Network Relay (i.e., upon explicit layer-2 link release or based on the absence of keep alive messages over PC5). As a result of the PDU session release procedure, the SMF may delete the SM context for the PDU session. Therefore, the UE-to-Network Relay does not have to inform the SMF that the remote UE has left. However, in this case, the 5G ProSe UE-to-Network Relay (UE-to-Network Relay) may send a report message indicating that the remote UE has left (or disconnected) to the SMF.

In the case of registration update procedure involving SMF change, the remote user ID corresponding to the remote UE may be transferred to the new SMF as part of SM context transfer.

In order for the SMF to obtain remote UE information, the HPLMN and the VPLMN where the UE-to-Network Relay is authorized to operate need to support the transfer of the remote UE related parameters.

After being connected to the UE-to-Network Relay, the remote UE may measure periodically the signal strength of the discovery signal sent by the UE-to-Network Relay for relay reselection.

As described above, according to the disclosure of the present specification, the SMF and the UE should be improved as follows.

The SMF needs to support procedures for remote UE report.
UE needs to support procedures for the remote UE and the UE-to-Network Relay.

VI. Variation

Instead that the relay UE creates and uses an unstructured type PDU session individually or dedicatedly for each remote UE, the relay UE may use one unstructured type PDU session for multiple remote UEs.

The specific operation is as follows. Below, the parts that are different from those described in the first to fourth disclosures will be mainly described.

1) When receiving a relay request for non-IP traffic from the first remote UE (i.e., remote UE-1) (which may be a layer-2 link establishment request), the relay UE may create an unstructured type PDU session for this purpose.

The relay UE stores mapping information for a PDU session ID, a QoS Flow ID (QFI), and a PC5 link identifier as context information for the corresponding remote UE.

Additionally, the N6 UPF may store information on a Point-to-Point (PtP) tunnel corresponding to this QoS flow.

2) When receiving a relay request for non-IP traffic from the second remote UE (i.e., remote UE-2) (which may be a layer-2 link establishment request), the relay UE may perform a procedure for modifying the created PDU session.

2-1) Specifically, the relay UE may transmit a PDU session modification request message to the SMF.

The message may include one or more of identifier information indicating the remote UE, information indicating that it is for the remote UE, and information indicating that it is a relay UE operation.

2-2) The SMF creates a new QoS flow based on the information included in the PDU session modification request message. Then, a new PtP tunnel is created. This PtP tunnel is a tunnel for transmitting and receiving unstructured PDU session type data through N6 with a destination (e.g., an application server) existing on a Data Network (DN).

That is, a new QoS flow and PtP tunnel different from the QoS flow and PtP tunnel created for the remote UE-1 in above 1) are created.

Additionally, the N6 UPF may store information about the PtP tunnel corresponding to this QoS flow.

2-3) The SMF transmits a response message to the PDU session modification request message to the relay UE.

The relay UE stores mapping information for a PDU session ID, a QoS Flow ID (QFI), and a PC5 link identifier as context information for the corresponding remote UE.

3) Upon receiving uplink traffic from the remote UE-1 through PC5, the relay UE transmits the traffic to the network using the QoS flow for this remote UE based on the mapping information stored in above 1). Upon receiving this, the N6 UPF transmits the traffic to the DN using the PtP tunnel corresponding to this QoS flow.

4) Upon receiving uplink traffic from the remote UE-2 through PC5, the relay UE transmits the traffic to the network using the QoS flow for this remote UE based on the mapping information stored in above 2-3). Upon receiving this, the N6 UPF transmits the traffic to the DN using the PtP tunnel corresponding to this QoS flow.

5) When the relay UE receives downlink traffic from the network, the relay UE determines to which remote UE the traffic is mapped. This may be determined based on the mapping of the QoS flow of the PDU session and the layer-2 link information of the remote UE, i.e., the information stored in above 1) and the information stored in above 2-3.

After the determination, the relay UE transmits traffic to the mapped remote UE through PC5.

As described above, when the N6 UPF receives downlink traffic from the DN transmitted using the QoS flow corresponding to the remote UE, it is transmitted to the UE through the QoS flow mapped to the PtP tunnel based on the received PtP tunnel.

It may be assumed that the unstructured type PDU session shared for the plurality of remote UEs is shared since the DNN+S-NSSAI is the same.

As described above, a method for a relay UE to support an unstructured PDU session, i.e., a method for a remote UE to transmit and receive non-IP data through a UE-to-Network Relay, may be extended and used for an IP type PDU Session, i.e., a method for a remote UE to transmit and receive IP data through a UE-to-Network Relay. In addition, the above-described method for a relay UE to support an unstructured PDU session may be extended and used for Ethernet type PDU session, i.e., a method for a remote UE to transmit and receive Ethernet data through a UE-to-Network Relay. In the former case, a unicast link for IP communication may be formed between a UE-to-Network Relay and a remote UE. In this case, in the case of multi-hops, all unicast links formed from the remote UE to the UE-to-Network Relay may be unicast links for IP communication. In the latter case, a unicast link for Ethernet communication may be formed between a UE-to-Network Relay and a remote UE. In this case, in case of multi-hops, all unicast links formed from the remote UE to the UE-to-Network Relay may be unicast links for Ethernet communication.

When the above-described method is extended to a method for supporting the remote UE to transmit and receive Ethernet data through a UE-to-Network Relay, upon receiving uplink traffic towards the network from one remote UE, the UE-to-network relay may transmit the uplink traffic to the network through an Ethernet type PDU session, and may also transmit through PC5 to other remote UE(s) that have established a unicast link for Ethernet communication. This may mean transmitting to the remote UE(s) providing network connection services for the same DNN+S-NSSAI as the received uplink traffic.

According to the content described above, the following advantageous effects can be exhibited.

In order for the UE to provide network connection services for non-IP communication, an unstructured PDU session may be created. In addition, the relay UE stores the context in relation to the created PDU session and the unicast link created with the remote UE (e.g., Remote UE in case of one-hop, Intermediate Relay UE in case of multi-hops), so that, in both one-hop and multi-hop cases, a UE-to-Network Relay operation may be efficiently performed.

Hereinafter, an apparatus to which the above disclosure of the present specification can be applied will be described.

Figure 15:
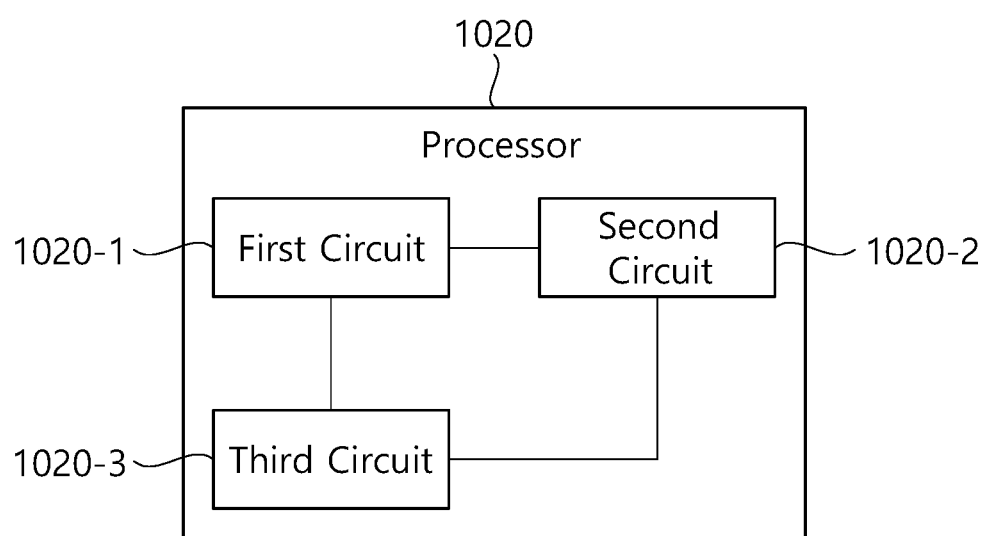
FIG. 15 shows a block diagram of a processor in which the disclosure of the present specification is implemented.

FIG. 15 shows a block diagram of a processor in which the disclosure of the present specification is implemented.

As can be seen with reference to FIG. 15, a processor 1020 in which the disclosure of the present specification is implemented includes a plurality of circuitry to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an Application-Specific Integrated Circuit (ASIC) or an Application Processor (AP), and includes at least one of a Digital Signal Processor (DSP), a Central Processing Unit (CPU), and a Graphics Processing Unit (GPU).

The processor may be a relay UE or a remote UE.

A case in which the processor is included in the relay UE will be described first.

The first circuit 1020-1 of the processor may receive a direct communication request message from a first remote UE.

The second circuit 1020-2 of the processor may perform a Protocol Data Unit (PDU) session establishment procedure with an Access and mobility Management Function (AMF) entity.

The third circuit 1020-3 of the processor may store mapping information between an identifier of a PC5 link with the first remote UE and an identifier of the PDU session based on the establishment of a PDU session for an unstructured PDU session type for unstructured traffic.

A fourth circuit (not shown) of the processor may transmit a direct communication accept message to the first remote UE.

The direct communication accept message may include an identifier of the PDU session.

The direct communication request message may be transmitted to establish a connection for one-to-one direct communication.

The PDU session establishment procedure may be performed based on Single Network Slice Selection Assistance Information (S-NSSAI), Data Network Name (DNN), or Quality of Service (QoS).

The PDU session establishment procedure may include: transmitting a PDU session establishment request message to the AMF entity, and receiving a PDU session establishment accept message from the AMF entity.

The mapping information may be stored within the context of the relay UE.

The context may include one or more of: DNN information, PDU session ID, PC5 link identifier information, identifier information informing the remote UE, remote user identifier information, Layer 2 identifier information, information informing a unicast link for a non-IP traffic, PC5 QoS Flow Identifier (PFI), and hop information.

A fifth circuit (not shown) of the processor may transmit a message indicating that a relay service is available in order to perform a relay discovery procedure.

The message may include DNN, slice information, information on a supportable PDU session type, or information on whether one-hop or multi-hop is supported.

The direct communication request message may include one or more of: information informing a direct communication for a non-IP communication, DNN information, identifier information informing the remote UE, remote user identifier information, information informing a desire to be provided with a network connection service, and hop information.

A sixth circuit (not shown) of the processor may receive a direct communication request message from a second remote UE.

A seventh circuit (not shown) of the processor may perform a new PDU session establishment procedure to relay unstructured traffic from the second remote UE.

The PDU session establishment procedure may be performed for each remote UE in order to relay unstructured traffic for each remote UE.

Figure 16:
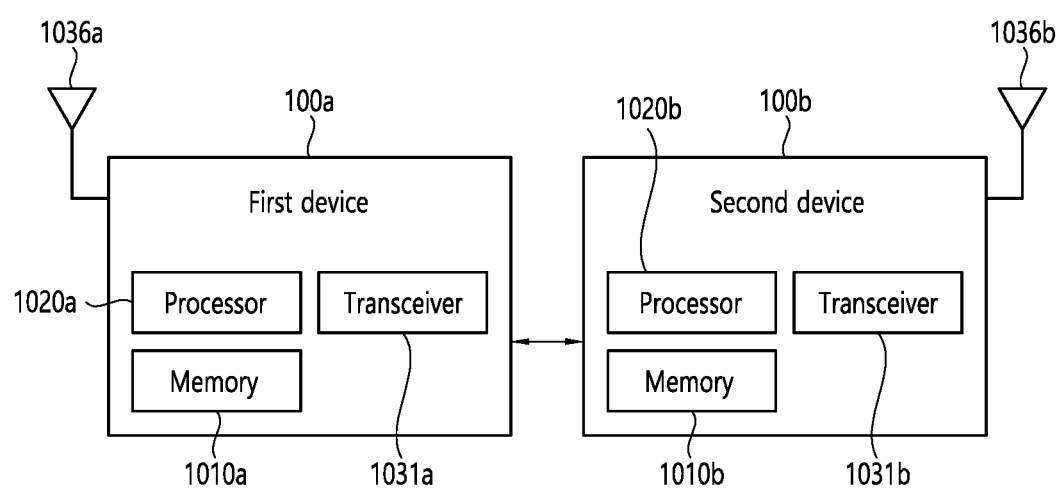
FIG. 16 illustrates a wireless communication system according to an embodiment.

FIG. 16 illustrates a wireless communication system according to an embodiment.

Referring to FIG. 16, the wireless communication system may include a first device 100a and a second device 100b.

The first device 100a may be a UE described in the disclosure of the present specification. Or, the first device 100a may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a network node (e.g., AMF or MME) described in the disclosure of the present specification. Or, the second device 100b may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 17:
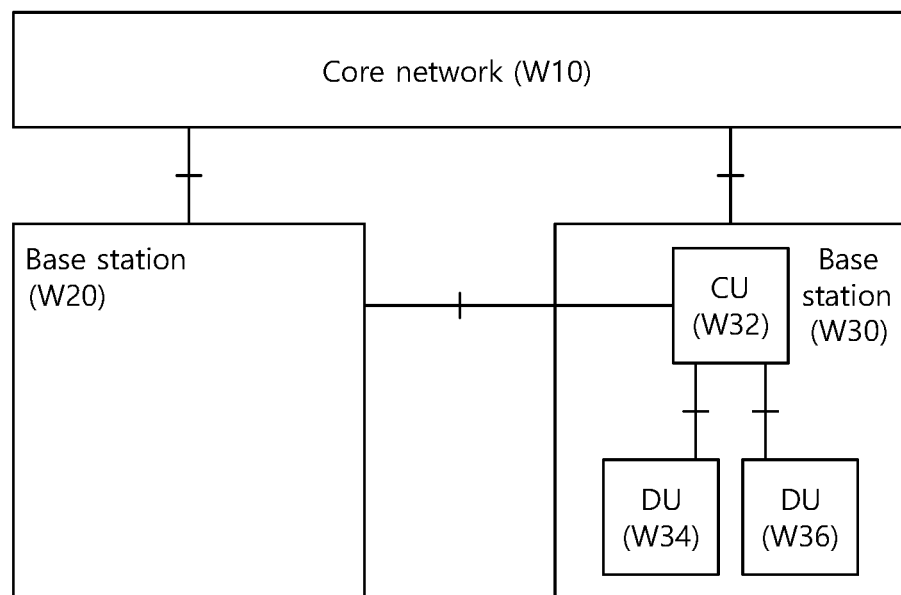
FIG. 17 illustrates a block diagram of a network node according to an embodiment.

FIG. 17 illustrates a block diagram of a network node according to an embodiment.

In particular, FIG. 17 is a diagram illustrating in detail a case in which a base station is divided into a Central Unit (CU) and a Distributed Unit (DU).

Referring to FIG. 17, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 18:
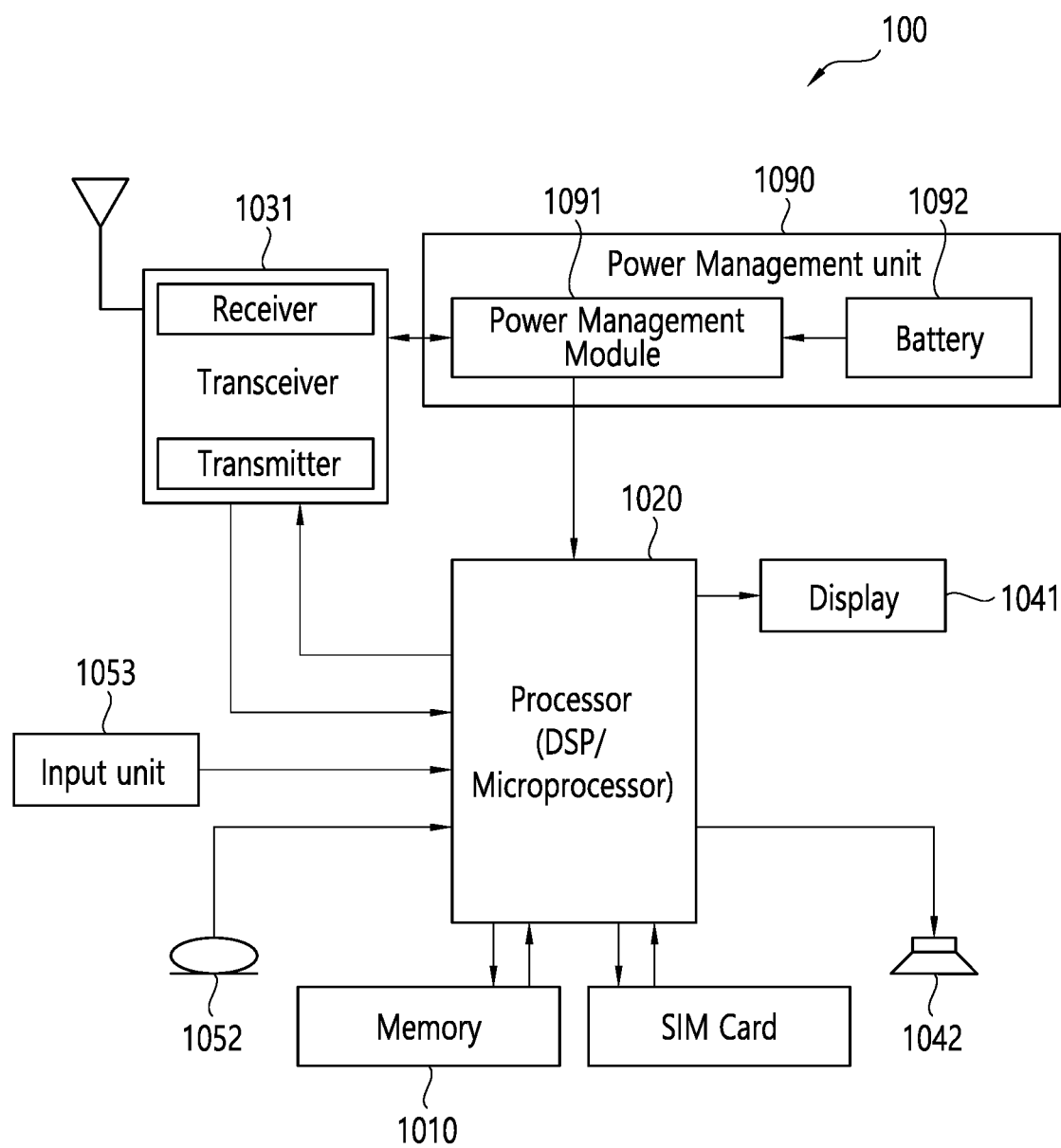
FIG. 18 is a block diagram illustrating a configuration of a UE according to an embodiment.

FIG. 18 is a block diagram illustrating a configuration of a UE according to an embodiment.

In particular, the UE 100 shown in FIG. 18 is a diagram illustrating the first device of FIG. 16 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 19:
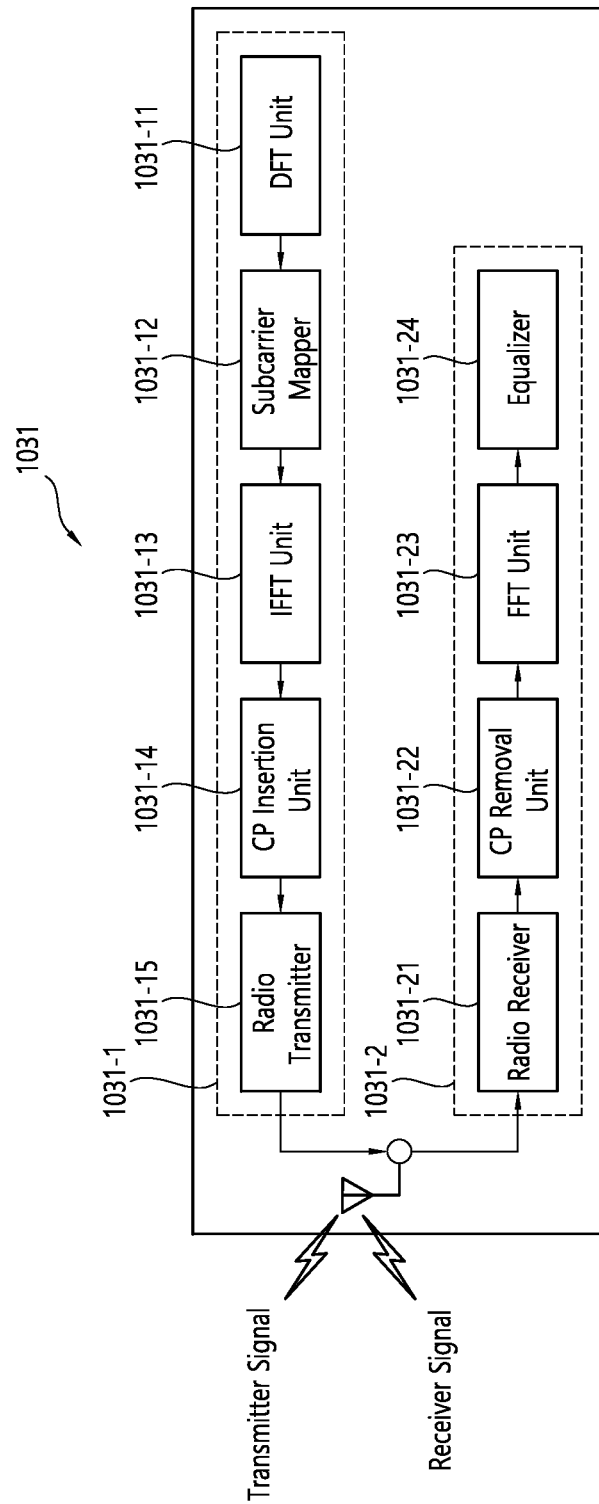
FIG. 19 is a detailed block diagram illustrating the transceiver of the first device shown in FIG. 16 or the transceiver of the device shown in FIG. 18 in detail.

FIG. 19 is a detailed block diagram illustrating the transceiver of the first device shown in FIG. 16 or the transceiver of the device shown in FIG. 18 in detail.

Referring to FIG. 19, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

<Scenario to which the Disclosure of the Present Specification can be Applied>

Although not limited thereto, various descriptions, functions, procedures, suggestions, methods and/or operational flowcharts of the disclosures of the present specification disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 20:
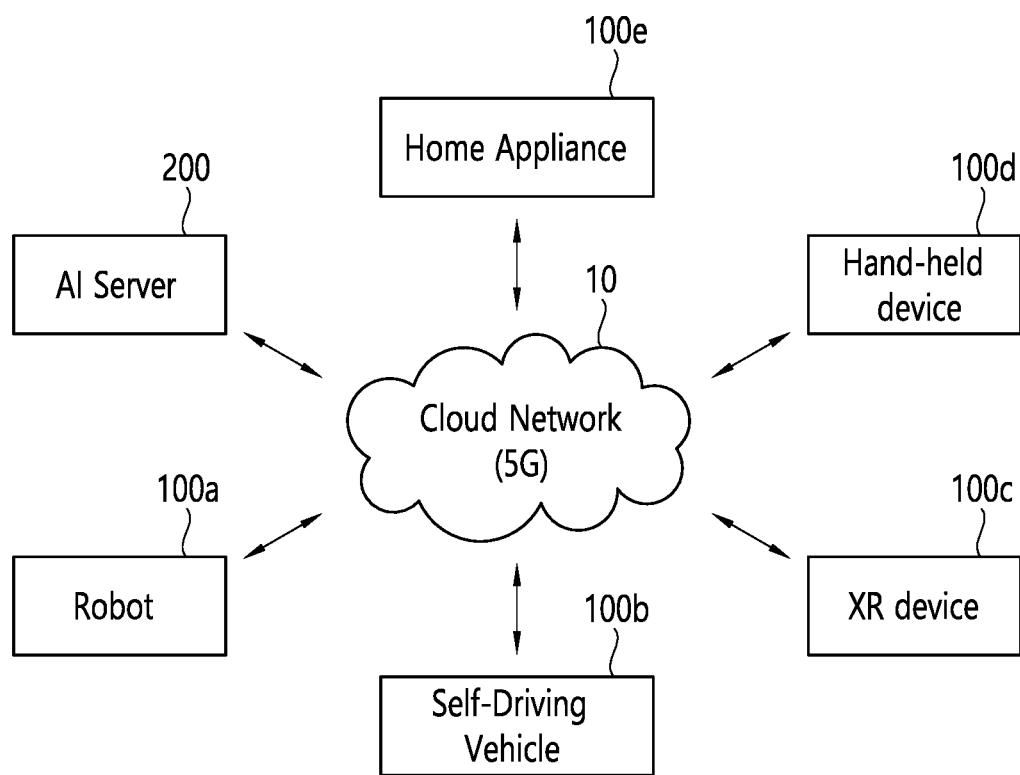
FIG. 20 illustrates a communication system 1 applied to the disclosure of the present specification.

FIG. 20 illustrates a communication system 1 applied to the disclosure of the present specification.

Referring to FIG. 20, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method for operating in a relay User Equipment (UE), the method comprising:
receiving a direct communication request message from a first remote UE for establishing a PC5 link with the first remote UE;
performing a Protocol Data Unit (PDU) session establishment procedure with an Access and mobility Management Function (AMF) entity;
based on an unstructured type PDU session being established by the PDU session establishment procedure for relaying an unstructured traffic between the first remote UE and a network, storing mapping information between an identifier of the PC5 link with the first remote UE and an identifier of the unstructured type PDU session;
transmitting a direct communication accept message to the first remote UE in response to the direct communication request message; and
relaying the unstructured traffic between the first remote UE and the network via the unstructured type PDU session based on the mapping information.

2. The method of claim 1, wherein the unstructured traffic corresponds to a non-Internet Protocol (IP) traffic transmitting.

3. The method of claim 1, wherein the direct communication accept message includes the identifier of the unstructured type PDU session.

4. The method of claim 1, wherein the PDU session establishment procedure is performed based on a Single Network Slice Selection Assistance Information (S-NSSAI), Data Network Name (DNN) or Quality of Service (QoS).

5. The method of claim 1, wherein the PDU session establishment procedure comprises:
transmitting a PDU session establishment request message to the AMF entity; and
receiving a PDU session establishment accept message from the AMF entity.

6. The method of claim 1, wherein the mapping information is stored within a context of the relay UE.

7. The method of claim 6, wherein the context includes one or more of:
DNN information;
PDU session ID;
PC5 link identifier information;
identifier information informing the remote UE;
remote user identifier information;
Layer 2 identifier information;
information informing a unicast link for a non-IP traffic;
PC5 QoS Flow Identifier (PFI); and
hop information.

8. The method of claim 1, wherein the method further comprises:
transmitting a message informing that a relay service is available, in order to perform a relay discovery procedure.

9. The method of claim 8, wherein the message includes DNN, slice information, information on types of supportable PDU sessions, or information on whether one-hop or multi-hop is supported.

10. The method of claim 1, wherein the direct communication request message includes one or more of:
information informing a direct communication for a non-IP communication;
DNN information;
identifier information informing the remote UE;
remote user identifier information;
information informing a desire to be provided with a network connection service; and
hop information.

11. The method of claim 1, wherein the method further comprises:
receiving a second direct communication request message from a second remote UE for establishing a second PC5 link with the second remote UE; and
performing a second PDU session establishment procedure with the unstructured type PDU session in order to relay an unstructured traffic of the second remote UE.

12. The method of claim 11, wherein the PDU session establishment procedure is performed for each remote UE in order to relay an unstructured traffic for each remote UE.

13. A chipset mounted on a relay User Equipment (UE), the chipset comprising:
at least one processor; and
at least one memory for storing instructions and operably electrically connectable to the at least one processor,
wherein the instructions, based on being executed by the at least one processor, perform operations comprising:
receiving a direct communication request message from a first remote UE for establishing a PC5 link with the first remote UE;
performing a Protocol Data Unit (PDU) session establishment procedure with an Access and mobility Management Function (AMF) entity;
based on an unstructured type PDU session being established by the PDU session establishment procedure for relaying an unstructured traffic between the first remote UE and a network, storing mapping information between an identifier of the PC5 link with the first remote UE and an identifier of the unstructured type PDU session;
transmitting a direct communication accept message to the first remote UE in response to the direct communication request message; and
relaying the unstructured traffic between the first remote UE and the network via the unstructured type PDU session based on the mapping information.

14. A relay User Equipment (UE) comprising:
a transceiver;
at least one processor; and
at least one memory for storing instructions and operably electrically connectable to the at least one processor,
wherein the instructions, based on being executed by the at least one processor, perform operations comprising:
receiving, the transceiver, a direct communication request message from a first remote UE for establishing a PC5 link with the first remote UE;
performing a Protocol Data Unit (PDU) session establishment procedure with an Access and mobility Management Function (AMF) entity;
based on an unstructured type PDU session being established by the PDU session establishment procedure for relaying an unstructured traffic between the first remote UE and a network, storing, in the at least one memory, mapping information between an identifier of the PC5 link with the first remote UE and an identifier of the unstructured type PDU session;
transmitting, using the transceiver, a direct communication accept message to the first remote UE in response to the direct communication request message; and
relaying, using the transceiver, the unstructured traffic between the first remote UE and the network via the unstructured type PDU session based on the mapping information.

15. The method of claim 6, wherein the context is updated based on a Layer-2 identifier, which is related to the PC5 link, of the first remote UE being updated.

* * * * *